United States Patent
Beaulieu et al.

(10) Patent No.: US 8,498,323 B2
(45) Date of Patent: Jul. 30, 2013

(54) ZONAL UWB RECEIVER AND METHOD

(75) Inventors: Norman C. Beaulieu, Edmonton (CA); Hua Shao, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 511 days.

(21) Appl. No.: 12/530,562

(22) PCT Filed: Mar. 7, 2008

(86) PCT No.: PCT/CA2008/000434
§ 371 (c)(1),
(2), (4) Date: Dec. 8, 2009

(87) PCT Pub. No.: WO2008/109990
PCT Pub. Date: Sep. 18, 2008

(65) Prior Publication Data
US 2011/0128994 A1      Jun. 2, 2011

Related U.S. Application Data

(60) Provisional application No. 60/894,035, filed on Mar. 9, 2007.

(51) Int. Cl.
*H04B 1/707* (2006.01)
*H04B 1/69* (2006.01)
(52) U.S. Cl.
USPC .......................................... 375/148; 375/138
(58) Field of Classification Search
USPC ................ 375/130, 138, 142–144, 147, 148, 375/150, 152, 316, 317, 343
See application file for complete search history.

(56) References Cited

U.S. PATENT DOCUMENTS

| 6,714,585 | B1 * | 3/2004 | Wang et al. .................... 375/148 |
| 7,079,604 | B1 | 7/2006 | Miller et al. |
| 7,542,528 | B1 | 6/2009 | Cheong |
| 2002/0131483 | A1 * | 9/2002 | Papasakellariou ............ 375/148 |
| 2004/0136439 | A1 | 7/2004 | Dewberry et al. |
| 2004/0242155 | A1 | 12/2004 | Spiridon et al. |
| 2004/0252647 | A1 * | 12/2004 | Chang et al. .................. 370/252 |
| 2004/0264701 | A1 | 12/2004 | Lee et al. |
| 2005/0031022 | A1 * | 2/2005 | Chen et al. .................... 375/148 |

(Continued)

OTHER PUBLICATIONS

M. Z. Win and R. A. Scholtz, "Ultra-wide bandwidth time-hopping spread-spectrum impulse radio for wireless Multiple-Access Communications," IEEE Trans. Commun., vol. 48, pp. 679-691, Apr. 2000.

(Continued)

*Primary Examiner* — Young T. Tse

(57) ABSTRACT

A novel ultra-wide bandwidth receiver structure dubbed the "zonal" receiver is proposed to detect time-hopping ultra-wide bandwidth signals in multiple access interference channels. The zonal receiver outperforms the conventional matched filter ultra-wide bandwidth receiver and the recently proposed soft-limiting ultra-wide bandwidth receiver when only MAI is present, or AWGN is negligible compared to MAI. In more practical mixed MAI-plus-AWGN environments, the zonal ultra-wide bandwidth receiver achieves better performance than the conventional matched filter ultra-wide bandwidth receiver, the recently proposed soft-limiting ultra-wide bandwidth receiver, and the recently proposed adaptive threshold soft-limiting ultra-wide bandwidth receiver. In multipath fading UWB channels, a new Rake receiver based on the zonal UWB receiver design has been proposed, this new Rake receiver can achieve better BER performance than the conventional matched filter based Rake receiver.

27 Claims, 16 Drawing Sheets

U.S. PATENT DOCUMENTS

| | | |
|---|---|---|
| 2005/0201446 A1 | 9/2005 | Bar-Ness et al. |
| 2006/0088080 A1* | 4/2006 | Cha et al. .................. 375/130 |
| 2006/0093077 A1 | 5/2006 | El Fawal et al. |
| 2006/0146915 A1 | 7/2006 | Gezici et al. |
| 2006/0268959 A1 | 11/2006 | Kim et al. |
| 2007/0036241 A1 | 2/2007 | Sahinoglu et al. |
| 2007/0136648 A1 | 6/2007 | Kwon et al. |
| 2008/0084917 A1 | 4/2008 | Sung et al. |
| 2008/0273629 A1 | 11/2008 | Beaulieu |
| 2010/0074307 A1 | 3/2010 | Beaulieu |

OTHER PUBLICATIONS

A. Taha and K. M. Chugg, "A theoretical study on the effects of interference on UWB multiple access impulse radio," in Proc. IEEE Asilomar Conf. on Signals, Systems and Computers, 2002, pp. 728-732.

B. Hu and N. C. Beaulieu, "Exact bit error rate analysis of TH-PPM UWB systems in the presence of multiple access interference," IEEE Commun. Lett., vol. 7, No. 12, pp. 572-574, Dec. 2003.

B. Hu and N. C. Beaulieu, "Accurate performance evaluation of time-hopping and direct-sequence UWB systems," IEEE Trans. Commun., vol. 53, pp. 1758-1766, Jun. 2005.

G. Durisi and G. Romano, "On the validity of Gaussian approximation to characterize the multiuser capacity of UWB TH-PPM," in Proc. IEEE Conf. on Ultra Wideband Systems and Technologies, 2002, pp. 157-161.

G. Durisi and S. Benedetto, "Performance evaluation of TH-PPM UWB systems in the presence of multiuser interference," IEEE Commun. Lett., vol. 7, No. 5, pp. 224-226, May 2003.

N. C. Beaulieu and B. Hu, "A soft-limiting receiver structure for time-hopping UWB in multiple access interference," in Proc. International Symposium on Spread Spectrum Techniques and Applications, ISSSTA, 2006, pp. 417-421.

N. C. Beaulieu and B. Hu, "An adaptive threshold soft-limiting UWB receiver with improved performance in multiuser interference", in Proc. IEEE International Conference on Ultra-Wideband, ICUWB, 2006, pp. 405-410.

J. G. Proakis, Digital Communications. New York: McGraw-Hill, 1995, pp. 236-239.

M. Sabattini, E. Masry and L. B. Milstein, "A non-Gaussian approach to the performance analysis of UWB TH-BPPM Systems," in Proc. IEEE Conf. on Ultra Wide-band Systems and Technologies, 2003, pp. 52-55.

International Search Report, International Application No. PCT/CA2008/000434, Jun. 9, 2008.

J. Zhang, T. D. Abhayapala, and R. A. Kennedy, "Performance of ultra-wideband correlator receiver using Gaussian monocycles," in Proc. IEEE Int. Conf. Commun., May 2003, pp. 2192-2196.

F. Ramirez-Mireles, "On the performance of ultra-wide-band signals in Gaussian noise and dense multi-path," IEEE Trans. Veh. Technol., vol. 50, pp. 244-249, Jan. 2001.

G. Durisi and S. Benedetto, "Performance evaluation and comparison of different modulation schemes for UWB multiaccess systems," in Proc. IEEE Int. Conf. Commun., May 2003, pp. 2187-2191.

F. Ramirez-Mireles, "Performance of ultrawideband SSMA using time hopping and M-ary PPM," IEEE J. Select. Areas Commun., vol. 19, pp. 1186-1196, Jun. 2001.

A. R. Forouzan, M. Nasiri-Kenari, and J. A. Salehi, "Performance analysis of time-hopping spread-spectrum multiple-access systems: uncoded and coded schemes," IEEE Trans. Wireless Commun., vol. 1, pp. 671-681, Oct. 2002.

K. A. Hamdi and X. Gu, "On the validity of the Gaussian approximation for performance analysis of TH-CDMA/OOK impulse radio networks," in Proc. IEEE Veh. Technol. Conf., Apr. 2003, pp. 2211-2215.

B. Hu and N. C. Beaulieu, "Accurate evaluation of multiple-access performance in TH-PPM and TH-BPSK UWB systems," IEEE Trans. Commun., vol. 52, No. 10, pp. 1758-1766, Oct. 2004.

B. Hu and N. C. Beaulieu, "Accurate performance evaluation of time-hopping and direct-sequence UWB systems in multi-user interference," IEEE Trans. Commun., vol. 53, No. 6, pp. 1053-1062, Jun. 2005.

K. A. Hamdi and X. Gu, "Bit error rate analysis for TH-CDMA/PPM impulse radio networks," in Proc. IEEE Wireless Commun. Networking Conf., Mar. 2003, pp. 167-172.

S. Niranjayan, A. Nallanathan, and B. Kannan, "Modeling of multiple access interference and BER derivation for TH and DS UWB multiple access systems," IEEE Trans. Wireless Commun., vol. 5, No. 10, pp. 2794-2804, Oct. 2006.

J. Foerster, "Channel modeling sub-committee report final," IEEE, New York, USA, Tech. Rep. IEEE P802.15-02/490r1-SG3a, Feb. 2003.

S. M. Kay, Fundamentals of Statistical Signal Processing, vol. II: Detection Theory.Upper Saddle River, NJ: Prentice Hall, 1998, vol. II, pp. 382-385.

J. H. Miller and J. B. Thomas, "Detectors for discrete-time signals in non-Gaussian noise," IEEE Trans. Inform. Theory, vol. IT-18, No. 2, pp. 241-250, Mar. 1972.

Office Action dated Aug. 1, 2011 from U.S. Appl. No. 12/114,321.
Office Action dated Jan. 23, 2012 from U.S. Appl. No. 12/598,706.
International Search Report dated Jul. 3, 2008 from International Patent Application No. PCT/CA2008/000434.
International Search Report dated Aug. 15, 2009 from International Patent Application No. PCT/CA2008/00835.

M. Z. Win and R. A. Scholtz, "On the robustness of ultra-wide bandwidth signals in dense multipath environments," IEEE Commun. Lett., vol. 2, pp. 51-53, Feb. 1998.

M. Z. Win, G. Chrisikos, and N. R. Sollenberger, "Performance of rake reception in dense multipath channels: implications of spreading bandwidth and selection diversity order," IEEE J. Select. Areas Commun., vol. 18, pp. 1516-1525, Aug. 2000.

\* cited by examiner

ZONAL UWB RECEIVER AND METHOD

RELATED APPLICATION

This application claims the benefit of U.S. Provisional Application No. 60/894,035 filed Mar. 9, 2007.

FIELD OF THE INVENTION

The invention relates to receivers and methods for performing reception of UWB (ultra-wide bandwidth) signals.

BACKGROUND OF THE INVENTION

Ultra-wide bandwidth (UWB) wireless is an emerging communication technology which offers promise as a solution for high capacity short-range wireless multiple access systems. In a UWB system, several transmitters can coexist viably in the coverage area. To avoid catastrophic collisions in multiple access systems, a time-hopping (TH) sequence is introduced in M. Z. Win and R. A. Scholtz, "Ultra-wide Bandwidth Time-hopping Spread-spectrum Impulse Radio for Wireless Multiple-Access Communication," IEEE Trans. Commun., vol. 48, pp. 679-691, April 2000 (hereinafter Win et al.). Multiple access interference (MAI) and its effect on system performance have been studied and analyzed in various publications, where the conventional single-user matched filter is used as the receiver detector. Meanwhile, it is important to recognize that while the matched filter is the optimal receiver structure when a signal is corrupted by additive white Gaussian noise (AWGN) (See J. G. Proakis, Digital Communications, $4^{th}$ ed. New York: McGraw-Hill, 1995, pp. 243 (hereinafter J. G. Proakis)), the MAI in an UWB system is not Gaussian distributed. For example, it has been shown a Gaussian approximation highly underestimates the BER of a UWB system when the MAI dominates the AWGN (See B. Hu and N. C. Beaulieu, "Exact bit error rate of TH-PPM UWB systems in the presence of multiple access interference," IEEE Commun. Lett., vol. 7, pp. 572-574, December 2003, B. Hu and N. C. Beaulieu, "Accurate performance evaluation of time-hopping and direct-sequence UWB systems," IEEE Trans. Commun., vol. 53, pp. 1758-1766, June 2005 (hereinafter B. Hu et al.), G. Durisi and G. Romano, "On the validity of Gaussian approximation to characterize the multiuser capacity of UWB TH-PPM," in Proc. IEEE Conf. on Ultra Wideband Systems and Technologies, pp. 157-161, May, 2002, and G. Durisi and S. Benedetto, "Performance evaluation of TH-PPM UWB systems in the presence of multiple access interference," IEEE Commun. Lett., vol.7, pp. 224-226, May 2003). In this case, the conventional matched filter is not necessarily an optimal receiver. Some new receiver structures have been proposed and shown to outperform the conventional single-user matched filter receiver. A soft-limiting UWB receiver was proposed in N. C. Beaulieu and B. Hu, "A Soft-limiting Receiver Structure for Time-hopping UWB in Multiple Access Interference," in Proc. International Symposium on Spread Spectrum Techniques and Applications, ISSSTA, 2006, pp. 417-421. This receiver structure can achieve 0 to 10 dB gain compared to the conventional matched filter UWB receiver when AWGN is absent. When both MAI and AWGN are present, the soft-limiting receiver underperforms the conventional matched filter for small and moderate signal-to-noise ratio (SNR), but achieves 1 dB gain for large SNR. A more complex receiver structure based on the soft-limiting receiver proposed in N. C. Beaulieu and B. Hu, "An Adaptive Threshold Soft-limiting UWB Receiver with Improved Performance in Multiuser Interference," in Proc. IEEE International Conference on Ultra-Wideband, ICUWB, 2006, pp. 405-410 employs an adaptive threshold. This adaptive soft-limiting receiver can always meet or outperform the conventional matched filter UWB receiver.

SUMMARY OF THE INVENTION

According to one broad aspect, the invention provides a method comprising: receiving a signal; performing a plurality of correlations upon the signal to produce a plurality of partial statistics relating to an information bit; transforming each partial statistic to produce a new partial statistic by: setting the new partial statistic to equal the partial statistic if the partial statistic is in one of the ranges $(-t_h,-t_l)$ and $(t_l,t_h)$ and otherwise setting the new partial statistic to zero, where $t_l>0$ and $t_h>t_l$; accumulating the new partial statistics to produce a decision statistic; making a decision based on the decision statistic.

In some embodiments, receiving a signal comprises receiving a time hopping UWB signal; performing a plurality of correlations comprises performing a respective correlation between the received signal and a pulse shape for each of a plurality of time hopped representations of the information bit.

In some embodiments, receiving a signal comprises receiving a signal having a carrier frequency and signal bandwidth, wherein the signal bandwidth satisfies at least one of: greater than 20% of the carrier frequency; and bandwidth greater than 500 MHz.

In some embodiments, receiving a signal comprises receiving a signal having a carrier frequency and signal bandwidth, where the signal bandwidth is greater than 15% of the carrier frequency.

In some embodiments, receiving a signal comprises receiving a signal that originally had pulses that are 1 ns in duration or shorter.

In some embodiments, performing a plurality of correlations comprises: performing the plurality of correlations in a RAKE receiver or a finger of a RAKE receiver.

In some embodiments, the method further comprises: adapting the thresholds $t_l$ and $t_h$ as a function of one or more channel measurements and/or estimates.

In some embodiments, adapting the thresholds comprises: adapting the thresholds $t_l$ and $t_h$ independently for each partial statistic.

In some embodiments, adapting the thresholds comprises: adapting the thresholds $t_l$ and $t_h$ commonly for all the partial statistics relating to the information bit.

In some embodiments, adapting the thresholds comprises: adapting the thresholds $t_l$ and $t_h$ independently for the partial statistics of all the information bits relating to the same packet, or a collection of information bits.

In some embodiments, adapting the thresholds comprises: determining an estimate of AWGN (additive white Gaussian noise); selecting the thresholds as a function of the estimate of AWGN.

In some embodiments, adapting the thresholds comprises: determining an estimate of multi-access interference; selecting the thresholds as a function of the estimate of multi-access interference.

In some embodiments, adapting the thresholds comprises: determining an estimate of AWGN; determining an estimate of multi-access interference; selecting the thresholds as a function of the estimate of AWGN and the estimate of multi-access interference.

In some embodiments, selecting the thresholds as a function of the estimate of AWGN and the estimate of multi-access interference is done using a table lookup.

In some embodiments, adapting the thresholds comprises: measuring and/or estimating at least one of signal amplitude, desired signal power, interference power, signal amplitude; selecting the thresholds as a function of the at least one of signal amplitude, desired signal power, interference power, signal amplitude.

In some embodiments, adapting the thresholds comprises: determining an estimate of a PDF (probability density function) of the interference-plus-noise; using the estimate of the PDF to determine the thresholds.

In some embodiments, the signal is a carrierless UWB signal.

In some embodiments, the signal is a carrier-based UWB signal, the method further comprising downconverting the carrier-based UWB signal to produce a downconverted signal before performing the plurality of correlations, the plurality of correlations being performed on the downconverted signal.

According to another broad aspect, the invention provides a method comprising: receiving a signal; performing a plurality of correlations upon the received signal to produce a plurality of partial statistics relating to an information symbol; transforming each partial statistic to produce a new partial statistic by: a) for at least one range of the partial statistic, setting the new partial statistic to equal the partial statistic; b) for at least one range of the partial statistic, setting the new partial statistic to a weighted version of the partial statistic; accumulating the new partial statistics to produce a decision statistic; making a decision based on the decision statistic.

In some embodiments, transforming each partial statistic to produce a new partial statistic further comprises: for at least one range of the partial statistic, setting the new partial statistic to be zero.

In some embodiments, receiving a signal comprises receiving a time hopping UWB signal; performing a plurality of correlations comprises performing a respective correlation between the received signal and a pulse shape for each of a plurality of time hopped representations of the information bit.

In some embodiments, receiving a signal comprises receiving a signal having a carrier frequency and signal bandwidth, wherein the signal bandwidth satisfies at least one of: greater than 20% of the carrier frequency; and bandwidth greater than 500 MHz.

In some embodiments, receiving a signal comprises receiving a signal having a carrier frequency and signal bandwidth, where the signal bandwidth is greater than 15% of the carrier frequency.

In some embodiments, receiving a signal comprises receiving a signal that originally had pulses that are 1 ns in duration or shorter.

In some embodiments, a receiver is configured to implement the method as summarized above.

According to another broad aspect, the invention provides a receiver comprising: at least one antenna; a baseband signal processing with zonal partial statistic transformation block that processes a signal to produce a decision.

In some embodiments, the receiver further comprises: an RF signal processing block that performs RF signal processing on a received signal via the antenna to produce a baseband signal, wherein the signal processed by the baseband signal processing with zonal partial statistic transformation block is the baseband signal.

In some embodiments, the baseband signal processing with zonal partial statistic transformation block is configured to: perform a plurality of correlations of the baseband signal to produce a plurality of partial statistics relating to an information bit; transform each partial statistic to produce a new partial statistic by: setting the new partial statistic to equal the partial statistic if the partial statistic is in one of the ranges $(-t_h, -t_l)$ and $(t_l, t_h)$ and otherwise setting the new partial statistic to zero, where $t_l > 0$ and $t_h > t_l$; accumulate the new partial statistics to produce a decision statistic; make a decision based on the decision statistic.

In some embodiments, the zonal UWB receiver structure is adopted in each finger of a Rake receiver (see M. Z. Win and R. A. Scholtz, "On the robustness of ultra-wide bandwidth signals in dense multipath environments," IEEE Commun. Lett., vol. 2, pp. 51-53, February 1998 (hereinafter Win et al. 1)) for signal recovery. The baseband signal processing of this zonal based Rake receiver is configured to: perform a plurality of correlations of the baseband signal to produce a plurality of partial statistics in each Rake finger, transform each partial statistic to produce a new partial statistic in each Rake finger by: setting the new partial statistic to equal the partial statistic if the partial statistic is in one of the ranges $(-t_h, -t_l)$ and $(t_l, t_h)$ and otherwise setting the new partial statistic to zero, where $t_l > 0$ and $t_h > t_l$; in each Rake finger, the new partial statistics relating to the same information bit are summed; maximal-ratio combining (MRC) diversity, or other combining scheme, is then used to combine the statistics from all the Rake fingers to produce a decision statistic; a decision is made based on the decision statistic.

BRIEF DESCRIPTION OF THE DRAWINGS

Embodiments of the invention will now be described with reference to the attached drawings in which.

DETAILED DESCRIPTION OF THE PREFERRED EMBODIMENTS

Figure 1:
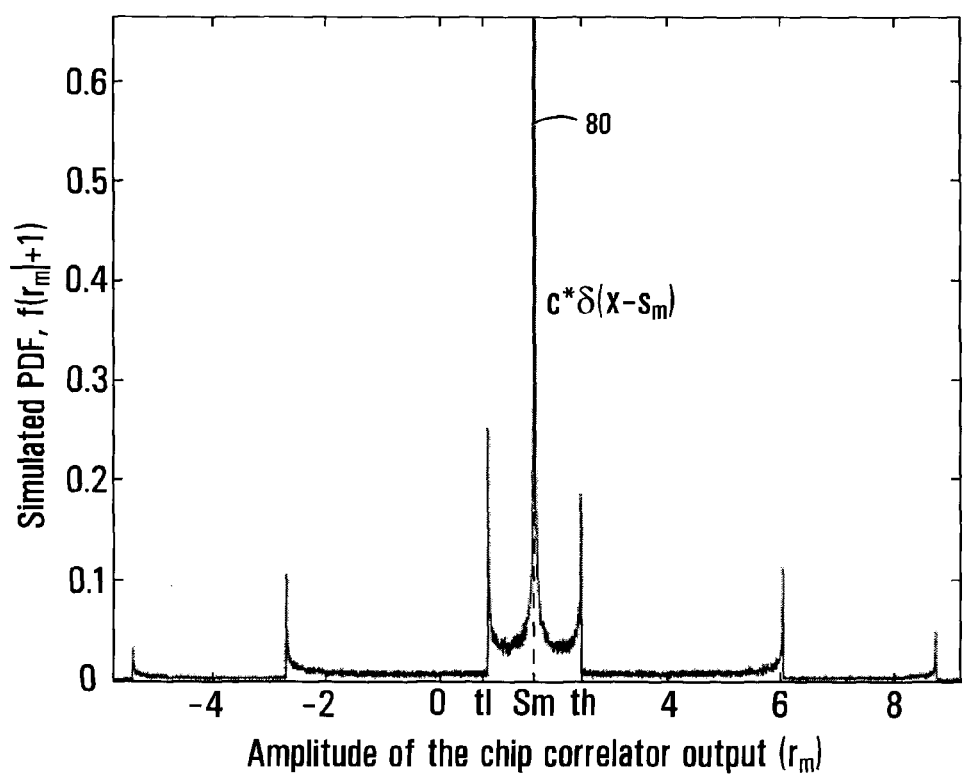
FIG. 1 is a plot of a simulated conditional probability density function (pdf) $f(r_m|d_0^{(1)}=+1)$ of the amplitude of the chip correlator output $r_m = I_m + S_m$, where $I_m$ is the MAI in the mth frame, the SIR=10 dB, and c is a constant.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A new receiver structure is provided, referred to herein as the "zonal" receiver, for detecting UWB signals in MAI. In free-space propagation channels, this structure outperforms both the conventional matched filter receiver and the above-referenced soft-limiting UWB receiver when no AWGN is present, or AWGN is negligible compared to MAI, at least for the set of assumptions made herein; in mixed MAI-plus-AWGN environments, the zonal receiver always meets or outperforms the conventional matched filter, the above-referenced soft-limiting UWB receiver and adaptive threshold soft-limiting UWB receiver, again at least for the set of assumptions made herein. In multipath fading UWB channels, a new Rake receiver based on the zonal UWB receiver design outperforms the conventional matched filter based Rake receiver (See Win et al. 1), again at least for the set of assumptions made herein.

System Model

The specific examples described herein relate to time-hopping binary phase shift keying (TH-BPSK). However, the analysis and results are similar for a binary pulse position modulation (PPM) scheme and other binary schemes using an appropriate template. A TH-BPSK signal can be described as $$s^{(k)}(t) = \sqrt{\frac{E_b}{N_s}} \sum_{j=-\infty}^{+\infty} d^{(k)}_{\lfloor j/N_s \rfloor} p(t - jT_f - c_j^{(k)} T_c) \quad (1)$$

where t is the transmitter clock time, $s^{(k)}(t)$ is the signal of the kth user, and $d_j^{(k)}$ is the jth information bit of the kth user, which takes values from $\{+1, -1\}$ with equal probabilities. The function p(t) is the transmitted UWB pulse with unit energy, i.e. $\int_{-\infty}^{+\infty} p^2(t)dt=1$, $E_b$ is the bit energy, $N_s$ is the number of frames which are used to transmit a single information bit, which is also known as the length of the repetition code, and $T_f$ is the duration of a single frame. Each frame is divided into chips with duration $T_c$. The sequence $\{c_j^{(k)}\}$ is the time-hopping sequence for the jth frame of the kth user which takes integer values in the range $0 \leq c_j^{(k)} < N_h$, where $N_h$ is the number of hops which should satisfy the condition $N_h T_c \leq T_f$. The product $c_j^{(k)} T_c$ represents an additional time shift added to the TH pulses to avoid catastrophic collisions between multiple users.

Assuming there are $N_u$ transmitters coexisting in the same coverage area of an ideal free-space propagation channel, the received signal can be written as $$r(t) = \sum_{k=1}^{N_u} A_k s^{(k)}(t - \tau_k) + n(t) \quad (2)$$

where n(t) is AWGN with two-sided power spectral density $N_0/2$, and the sequences $\{A_k\}_{k=1}^{N_u}$ and $\{\tau_k\}_{k=1}^{N_u}$ are the attenuations and delays of the kth user, respectively. The random variables (RVs) $\{\tau_k\}_{k=2}^{N_u}$ can be assumed to be uniformly distributed on $(0, T_b)$, and the delay for the first user $\tau_l$ is assumed to be known at the receiver side without loss of generality.

Receiver Structure

At the receiver side, it is assumed that the signal from the first user is the desired signal and $d_0^{(1)}$ is the transmitted symbol. Without loss of generality, we will set $C_m^{(1)}=0$, for all m (See B. Hu et al.). Assuming perfect time synchronization, the single-user CMF which adopts $p(t-\tau_l-mT_f)$ as the correlation waveform, is used to coherently detect the signal to be recovered. The final decision statistic for the CMF UWB receiver can be expressed as $$r = \sum_{m=0}^{N_s-1} \int_{mT_f+\tau_1}^{(m+1)T_f+\tau_1} r(t)p(t - \tau_1 - mT_f)dt \quad (3)$$
$$= S + I + N$$

where N is a Gaussian RV with zero mean and variance $N_0 N_s/2$, and $S = A_l \sqrt{E_b N_s} d_0^{(1)}$ where $d_0^{(1)}$ is the information bit transmitted by the desired user. The parameter I is the total MAI originating from all frames, which can be represented as $$I = \sqrt{\frac{E_b}{N_s}} \sum_{k=2}^{N_u} A_k I^{(k)} \quad (4)$$

where $I^{(k)}$ is the interference from the kth user expressed as $$I^{(k)} = \sum_{m=0}^{N_s-1} \int_{mT_f+\tau_1}^{(m+1)T_f+\tau_1} s^{(k)}(t - \tau_k) p(t - \tau_1 - mT_f) dt. \quad (5)$$

Substituting (1) into (5) and denoting the autocorrelation function of the UWB pulse waveform p(t) by R(t), $I^{(k)}$ can be rewritten as $$I^{(k)} = \sum_{m=0}^{N_s-1} \sum_{j=-\infty}^{+\infty} d^{(k)}_{\lfloor j/N_s \rfloor} R(\tau_s + mT_f - jT_f - c_j^{(k)} T_c). \quad (6)$$

The time shift difference between different users can be modelled as (see Win et al.):

$$\tau_l - \tau_k = m_k T_f + \alpha_k \qquad (7)$$

where $m_k$ is the value of the time uncertainty rounded to the nearest integer, and $\alpha_k$ is the fractional part which is uniformly distributed in the interval $(-T_f/2, T_f/2)$. Then the argument of $R(\cdot)$ is $$(m + m_k - j)T_f - c_j^{(k)} T_c + \alpha_k. \qquad (8)$$

If the assumption $N_h T_c < T_f/2 - 2T_p$ from Win et al. is adopted, which means that the pulse can only hop over an interval of one-half of a frame time, $I^{(k)}$ can be rewritten as $$I^{(k)} = \sum_{m=0}^{N_s-1} \sum_{j=-\infty}^{+\infty} d_{\lfloor (m+m_k)/N_s \rfloor}^{(k)} R(\alpha_k - c_{m+m_k}^{(k)} T_c). \qquad (9)$$

Putting (9) back into (4), the total interference term can be expressed as $$I^{(k)} = \sqrt{\frac{E_b}{N_s}} \sum_{k=2}^{N_u} A_k \sum_{m=0}^{N_s-1} d_{\lfloor (m+m_k)/N_s \rfloor}^{(k)} R(\alpha_k - c_{m+m_k}^{(k)} T_c) \qquad (10)$$

$$= \sum_{m=0}^{N_s-1} \sum_{k=2}^{N_u} A_k \sqrt{\frac{E_b}{N_s}} d_{\lfloor (m+m_k)/N_s \rfloor}^{(k)} R(\alpha_k - c_{m+m_k}^{(k)} T_c)$$

$$= \sum_{m=0}^{N_s-1} I_m$$

where $I_m$ is the interference term in the mth frame, which is given by $$I_m = \sum_{k=2}^{N_u} A_k \sqrt{\frac{E_b}{N_s}} d_{\lfloor (m+m_k)/N_s \rfloor}^{(k)} R(\alpha_k - c_{m+m_k}^{(k)} T_c). \qquad (11)$$

Then the final receiver decision statistic can be expressed as a summation of statistics in each frame $$r = \sum_{m=0}^{N_s-1} r_m = \sum_{m=0}^{N_s-1} (S_m + I_m + N_m) \qquad (12)$$

$$= \sum_{m=0}^{N_s-1} (S_m + Y_m)$$

where $S_m = A_l \sqrt{E_b/N_s} d_0^{(t)}$ is desired signal component in the mth frame, $N_m$ is a Gaussian distributed RV with variance $N_0/2$, and $I_m$ is the total interference component in the mth frame from all interferers given in (11). The RV $Y_m$ is the overall disturbance (MAI plus AWGN) in the mth frame.

Figure 2:
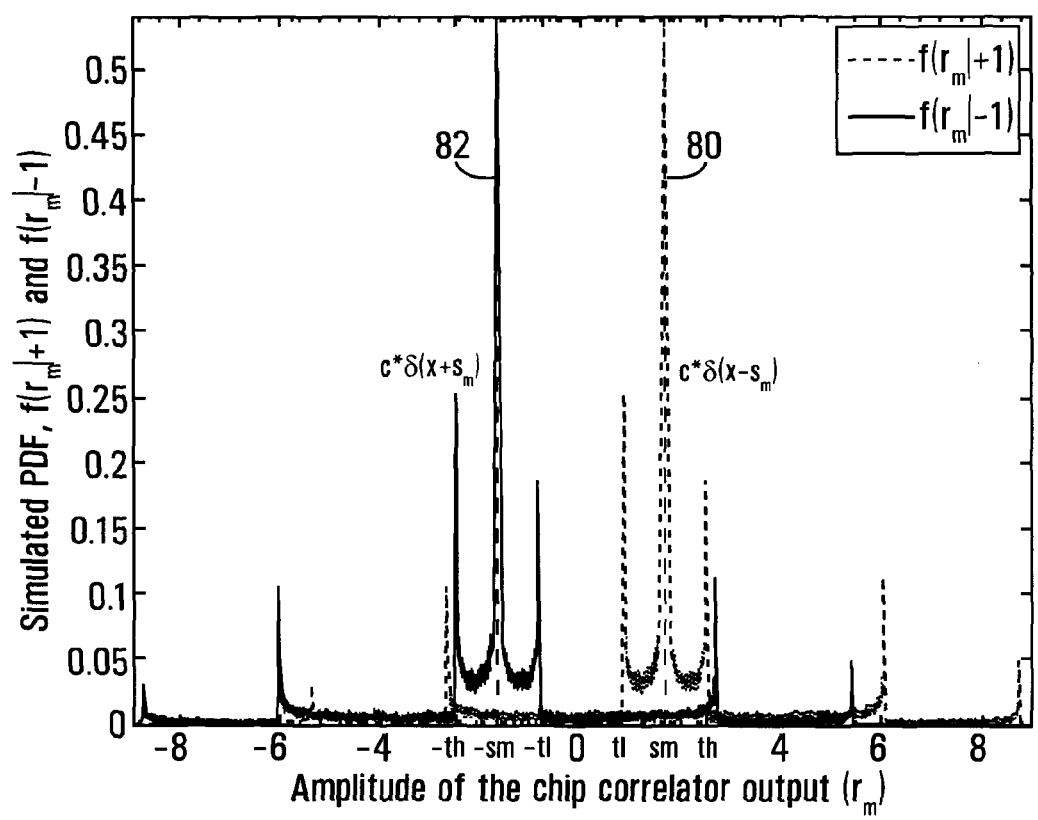
FIG. 2 is a plot of simulated conditional probability density functions (pdfs) $f(r_m|d_0^{(1)}=+1)$ and $f(r_m|d_0^{(1)}=+1)$ of the amplitude of the chip correlator output $r_m = I_m + S_m$, where $I_m$ is the MAI in the mth frame, the SIR=10 dB, and c is a constant.

For the case where the MAI dominates the AWGN, the noise term is negligible and $r_m$ can be expressed as $S_m + I_m$. FIG. 1 shows an example of the form of the conditional probability density function (pdf) of the chip correlator output $r_m$ when the information bit +1 was sent, $f(r_m | d_0^{(t)} = +1)$, generally indicated at 80. These results are obtained by simulation. The following observations are noted. There is an impulse at the point $r_m = S_m$ and the probability that $r_m$ assumes values in the region $(t_l, t_h)$ is significant, as large or larger than the probability that $r_m$ falls outside of $(t_l, t_h)$. FIG. 2 shows $f(r_m | d_0^{(1)} = +1)$ (curve 80) and $f(r_m | d_0^{(1)} = -1)$ (curve 82) together. Recall that the optimal, minimum probability of error, decision rule operating on $N_s$ independent samples, $r_m$, specifies that the receiver decides +1 as the transmitted bit when $f(r_m | d_0^{(1)} = +1) > f(r_m | d_0^{(1)} = -1)$ and decides −1 when $f(r_m | d_0^{(1)} = -1) > f(r_m | d_0^{(1)} = +1)$ (See J. G. Proakis, pp. 243). Observe in FIG. 2 that if $r_m$ falls outside $(-t_h, -t_l)$ and $(t_l, t_h)$, it is unreliable to decide the information bit as +1 or −1 because $f(r_m | d_0^{(1)} = +1)$ and $f(r_m | d_0^{(1)} = -1)$ are small and almost the same outside these regions.

In a new UWB receiver structure provided by an embodiment of the invention, instead of making a decision based on the statistic $$r = \sum_{m=0}^{N_s-1} r_m,$$

the new receiver will decide the transmitted signal based on the statistic $\tilde{r}$ which is calculated as $$\tilde{r} = \sum_{m=0}^{N_s-1} \tilde{r}_m \qquad (13)$$

where the new partial statistics $\tilde{r}_m$ $\tilde{r}$ are obtained as $$\tilde{r}_m = \begin{cases} r_m & r_m \in (t_l, t_h) \text{ or } (-t_h, -t_l) \\ 0 & \text{otherwise.} \end{cases} \qquad (14)$$

Eq. (14) defines a transform of the chip correlator output, $r_m$, into a partial receiver statistic, $\tilde{r}_m$. The transmitted information bit $d_0^{(1)}$ is detected based on the new decision statistic $\tilde{r}$ according to the rule $$\tilde{r} > 0 \Rightarrow d_0^{(1)} = +1 \qquad (15a)$$

$$\tilde{r} > 0 \Rightarrow d_0^{(1)} = -1 \qquad (15b)$$

Figure 4:
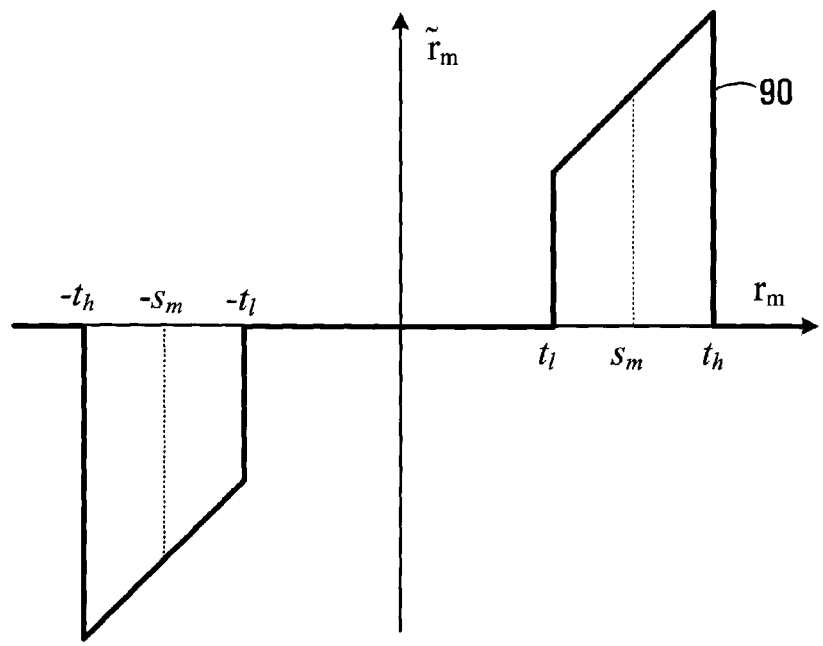
FIG. 4 is a plot of an example transfer characteristic of the zonal correlator output transform of FIG. 3.

If $\tilde{r} = 0$, a fair coin may be tossed to decide which information bit was transmitted, or $d_0^{(1)} = +1$ can be decided, or $d_0^{(1)} = -1$ can be decided. FIG. 4 shows the transfer characteristic of the receiver chip correlator output transform generally indicated at 90.

With the zonal receiver design rule (14), if the chip correlator output $r_m$ falls into the region $(t_l, t_h)$, there is a relative large probability that the transmitted information bit is +1, and if $r_m$ falls into $(-t_h, -t_l)$, the transmitted information bit is more likely to be −1. So if the chip correlator output $r_m$ falls into $(t_l, t_h)$ or $(-t_h, -t_l)$, the zonal UWB receiver uses the sample unaltered and lets it contribute to the final receiver decision statistic $\tilde{r}$. If $r_m$ falls outside of these two regions, one can hardly discern which information bit was transmitted; in this case, the receiver discards the sample and adds 0 to $\tilde{r}$ to eliminate $r_m$'s effect on the final decision statistic. Observe also that a large impulse of interference in a frame is completely eliminated from the decision statistic if it is greater than $|t_h|$ in amplitude. This feature gives the zonal receiver robustness in impulsive interference, regardless of the distribution of the impulsive interference.

Figure 3:
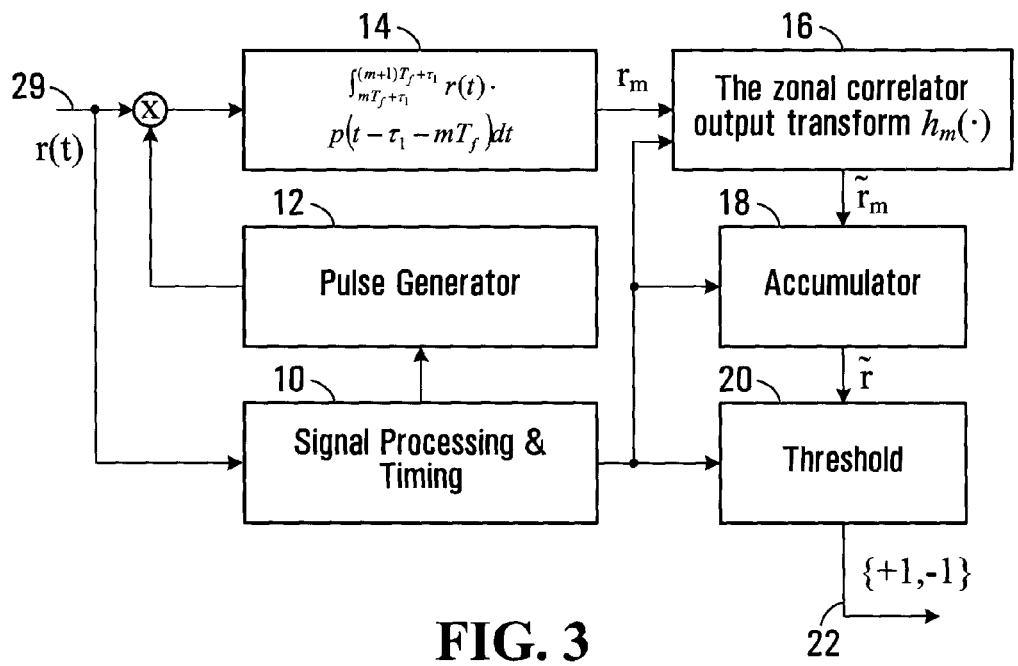
FIG. 3 is a block diagram of a UWB receiver provided by an embodiment of the invention.

A block diagram showing an example implementation of a zonal UWB receiver is shown in FIG. 3. The term "zonal receiver" is used to signify that partial decision statistics are treated differently for various zones of the partial decision statistic. The receiver has an input 29 for receiving a received signal r(t), signal processing and timing block 10, pulse generator 12, correlator 14 operatively coupled together in sequence. The output of the correlator is input to a zonal correlator output transform 16. The zonal correlator output transform 16 produces the partial statistics $\tilde{r}_m$, that are passed to an accumulator 18 where they are accumulated to produce the overall decision statistic $\tilde{r}$. This is then processed by threshold block 20 to produce an output 22. The zonal correlator output transform 16, accumulator 18, and threshold function 20 are also operatively coupled to the baseband processing and timing function.

In operation, the received signal r(t) is processed by signal processing and timing block 10 to recover timing. As a function of this timing, the pulse generator 12 generates a pulse for use by correlator 14 in performing a correlation between the pulse and r(t). The output $r_m$ of the correlator 14 is passed to the zonal correlator output transform 16 where it is transformed as described in detail (using equation 14) to produce the partial statistic $\tilde{r}_m$. The $\tilde{r}_m$'s relating to the same bit are summed in the accumulator 18 to produce $\tilde{r}$, and a final decision on the sum is made by the threshold function 20. The output of the signal processing and timing block 10 is used to synchronize these blocks 16,18,20. The output tells block 16 when to do the transform. It tells block 18 when to perform the accumulation, and what partial statistics belong to the same information. As for block 20, this output controls the timing of when to make the decisions according to the final statistics.

Performance Results and Discussion

The average bit error rate (BER) performance of the zonal UWB receiver is evaluated and compared to that of the conventional matched filter UWB receiver, the above-referenced soft-limiting UWB receiver and the above-referenced adaptive threshold soft-limiting UWB receiver. The signal waveform for the analysis is restricted to the second-order Gaussian monocycle with parameters given in Table I:

TABLE I

PARAMETERS OF THE UWB SYSTEM

| Parameter | Notation | Values |
| --- | --- | --- |
| Time Normalization Factor | $\tau_p$ | 0.2877 ns |
| Frame width | $T_f$ | 20 ns |
| Chip width | $T_c$ | 0.9 ns |
| No. of Users | $N_u$ | 4 |
| No. of Chips per Frame | $N_h$ | 8 |
| Repetition Code Length | $N_s$ | 4 |

Simulations are carried out for 2 cases. The first case is when only MAI is present, or AWGN is negligible compared to MAI, in the channel, representing interference-limited operation. The performance of the zonal UWB receiver is compared with the CMF UWB receiver and the above-referenced soft-limiting UWB receiver in this case. The second case is when both MAI and AWGN are present in the channel. The performance of the zonal UWB receiver is compared with the CMF UWB receiver, the above-referenced soft-limiting and the above-referenced adaptive threshold soft-limiting UWB receiver. The SNR and SIR are defined as $$SNR = \frac{E_b}{N_0} \quad (16)$$

$$SIR = \frac{A_1^2 E_b N_s}{\text{var}[I]} \quad (17)$$
$$= \frac{A_1^2 N_s}{\sigma_1^2 \sum_{k=2}^{N_s} A_k^2}$$

where $\sigma_1^2$ is defined in Win et al. as $$\sigma_1^2 = \frac{1}{T_f} \int_{-\infty}^{+\infty} \left[ \int_{-\infty}^{+\infty} p(x-t)p(x)dx \right]^2 dt \quad (18)$$
$$= \frac{1}{T_f} \int_{-\infty}^{+\infty} R^2(t)dt$$

where R(t) is the autocorrelation function of the second-order Gaussian monocycle.

Zonal Receiver Structure with Fixed Thresholds

In some embodiments, the thresholds of the zonal UWB receiver can be fixed to certain values selected based on one or more channel quality parameters. This might be appropriate, for example, when operating in a scenario where the MAI is dominant compared to the AWGN.

Figure 5:
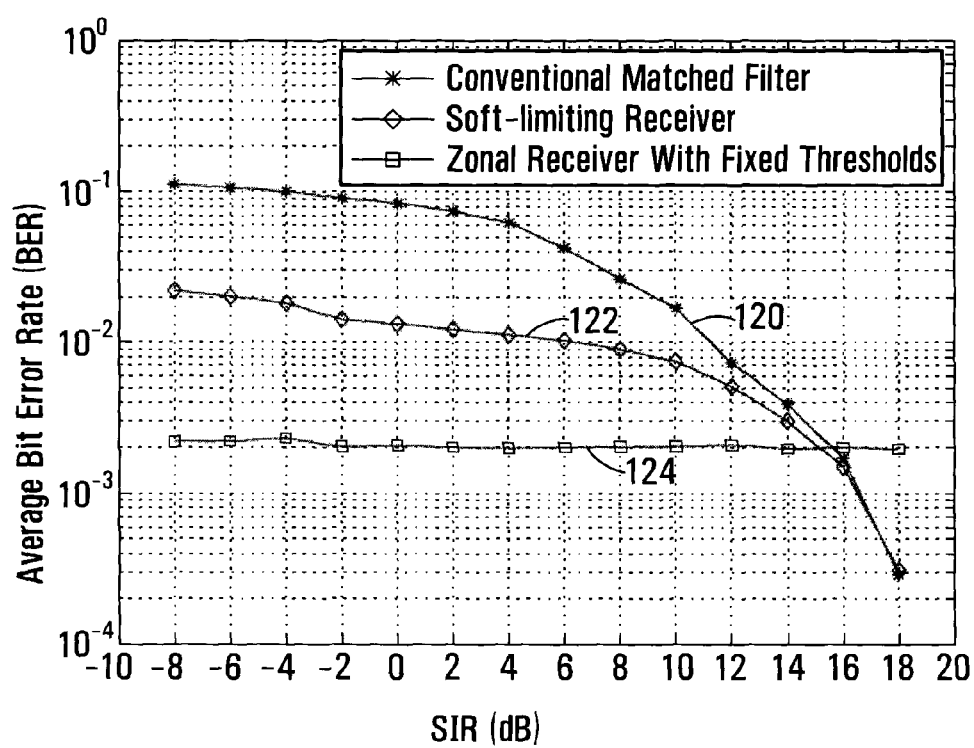
FIG. 5 contains plots of the average BER versus SIR of the conventional matched filter UWB receiver, the soft-limiting UWB receiver and the zonal UWB receiver with fixed thresholds with Ns=4 and Nu=4 when only MAI is present in free-space propagation UWB channels.

FIG. 5 shows the BER curves for the conventional matched filter UWB receiver (curve 120), the soft-limiting UWB receiver (curve 122) and the zonal UWB receiver (curve 124) with fixed thresholds when only MAI is present in the channel, and $S_m-0.05$ and $S_m+0.05$ are adopted as the lower and upper thresholds. Observe that in the SIR region [−8 dB, 14 dB], the zonal UWB receiver with fixed thresholds outperforms the other two UWB receivers. The performance gains are significant when the SIR is small. The BER of the zonal UWB receiver is as much as 50 times smaller than the BER of the conventional matched filter UWB receiver, and as much as 10 times smaller than the BER of the soft-limiting receiver in this SIR region. These large gains can not be achieved when there is AWGN in the system as subsequent results will show. As the SIR becomes larger, the BER curve for the zonal receiver remains level while those of the conventional matched filter UWB receiver and the soft-limiting UWB receiver decrease rapidly and cross below the BER curve of the zonal receiver when the SIR exceeds 14 dB. The zonal receiver with fixed thresholds underperforms the conventional matched filter UWB receiver and the soft-limiting receiver for large values of SIR.

Adaptive Zonal Receiver Structure

In some embodiments, the thresholds $t_l$ and $t_h$ are adaptive. It is noted that in such systems, if the lower threshold $t_l$ can be set all the way to 0 and the upper threshold $t_h$ can be set to infinity (or some large number), the zonal receiver becomes exactly the conventional matched filter UWB receiver for those threshold settings. Thus, in the adaptive embodiments, the zonal UWB receiver can always meet or outperform the conventional matched filter UWB receiver. This will be true for arbitrary additive signal disturbances, including MAI, AWGN, and MAI-plus-AWGN.

In some embodiments, experiment or computer searching can be used to obtain the optimal lower and upper thresholds that minimize the BER as a function of one or more channel quality parameters, or maximize the SINR as a function of one or more channel quality parameters.

Figure 7:
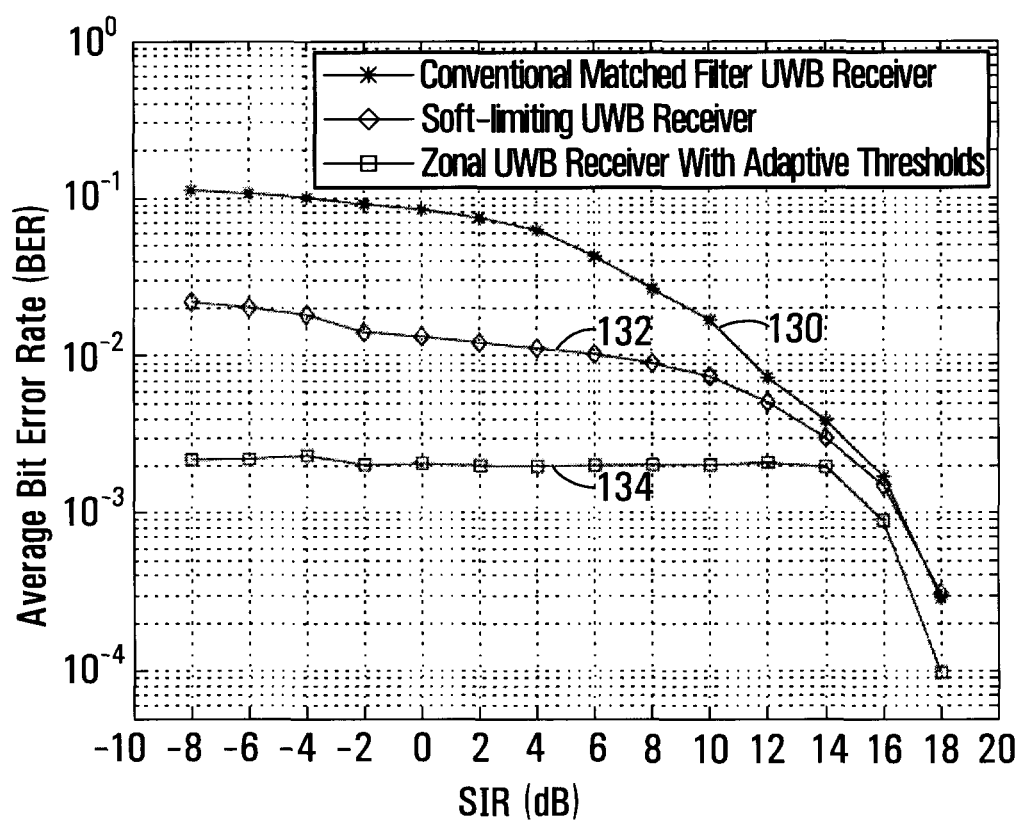
FIG. 7 contains plots of the average BER versus SIR of the conventional matched filter UWB receiver, the soft-limiting UWB receiver and the zonal UWB receiver with adaptive thresholds with Ns=4 and Nu=4 when only MAI is present in free-space propagation UWB channels.

Referring to FIG. 7, some example BER curves for the conventional matched filter UWB receiver (curve 130), the soft-limiting UWB receiver (curve 132) and the adaptive zonal receiver (curve 134) are shown in FIG. 7. The assumptions for these examples are the same as for the examples of FIG. 5. It is seen that the zonal UWB receiver with adaptive thresholds outperforms both the conventional matched filter UWB receiver and the soft-limiting UWB receiver for all SIR values in this case. When the SIR is small, the performance gains are the same as those of the zonal receiver with fixed thresholds seen previously in FIG. 5. The gain decreases as the SIR increases. For example, when SIR=18 dB, the zonal receiver with adaptive thresholds achieves ⅓ the BER of the conventional matched filter UWB receiver and the soft-limiting UWB receiver.

Though the zonal UWB receiver with fixed thresholds does not perform as well as the zonal UWB receiver with adaptive thresholds and it underperforms the conventional matched filter UWB receiver and the soft-limiting UWB receiver when the SIR is large, it is still very useful because the structure is simple and easy to implement since no search is needed to obtain thresholds. The zonal UWB receiver with fixed thresholds can be used effectively to detect UWB signals when the SIR is small to moderately large.

Figure 8:
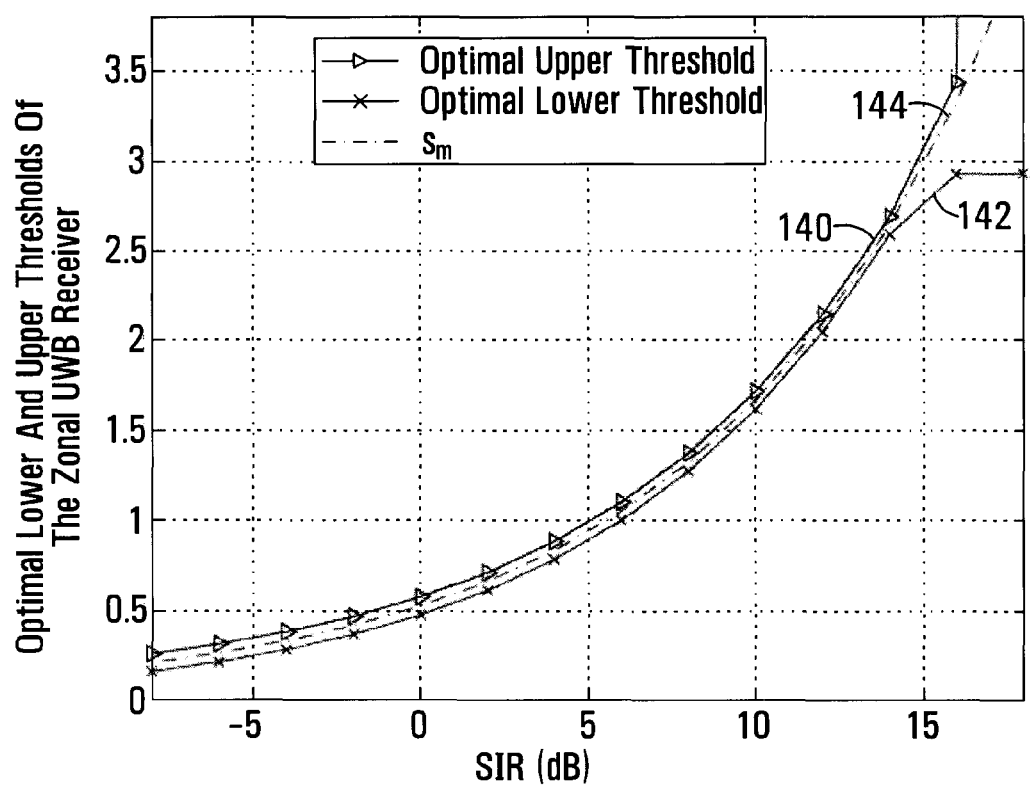
FIG. 8 contains plots of optimal lower and upper thresholds of the zonal UWB receiver with Ns=4 and Nu=4 when only MAI is present in free-space propagation UWB channels.

FIG. 8 shows the optimal lower and upper thresholds of the zonal UWB receiver for all SIR values in the example of FIG. 7. Specifically plots are shown in the optimal upper threshold 140, the optimal lower threshold 142 and $S_m$ 144. Some very interesting observations and conclusions follow from this figure. Note that in the SIR region [−8 dB, 14 dB], the optimal lower threshold $t_l$ and upper threshold $t_h$ are well approximated by $S_m-0.05$ and $S_m+0.05$, respectively. Considering FIGS. 1 and 2, and the associated discussion, it is to be expected that with the optimal lower and upper thresholds, $(t_l, t_h)$ and $(-t_h, -t_l)$ will enclose small regions centered around $S_m$ and $-S_m$. One can explain the near independence of $(t_l, t_h)$ on SIR in the following way. In the interference-limited case, consider the statistics of the MAI to be fixed, and then increasing the SIR corresponds to increasing the value of $|S_m|$, or translating the conditional pdf of the MAI. Note that the distribution of $r_m$ then remains the same in the region $(S_m-0.05, S_m+0.05)$. Hence, the probability that n falls into $(S_m-0.05, S_m+0.05)$ is not changing with the SIR in this case. This explains why the lower and upper thresholds of the zonal UWB receiver are well approximated by $S_m-0.05$ and $S_m+0.05$, and why the performance of the zonal UWB receiver with fixed thresholds $S_m-0.05$ and $S_m+0.05$ is almost constant (FIG. 5), and why the performance of the zonal UWB receiver with adaptive thresholds changes little as the SIR increases from −8 dB to 14 dB (FIG. 7). However, as the SIR becomes larger than 14 dB, the left tail of the conditional pdf $f(r_m|d_0^{(1)}=+1)$ moves increasingly above $r_m=0$. Note that $r_m$, the amplitude of the chip correlator output has a lower bound and the pdf of $r_m$ will be zero below this lower bound. This means that the performance of the zonal receiver with fixed thresholds will level off for large values of SIR. On the other hand, the BER curves for the conventional matched filter UWB receiver and the soft-limiting UWB receiver converge and decrease rapidly as the SIR increases above 14 dB. Therefore, the zonal UWB receiver with fixed thresholds will underperform the conventional matched filter UWB receiver and the soft-limiting UWB receiver for large values of SIR, which is shown by FIG. 5. However, the zonal receiver structure with adaptive lower and upper thresholds will outperform the other two receivers. Observe in FIG. 8 that both optimal lower and upper thresholds of the zonal UWB receiver move farther away from the value $S_m$ as the SIR gets larger than 14 dB, which makes the zonal receiver structure similar to the conventional matched filter UWB receiver. FIG. 7 shows that, with optimal lower and upper thresholds, the zonal UWB receiver's BER performance improves with increasing SIR and surpasses those of the conventional matched filter UWB receiver and the soft-limiting UWB receiver.

Figure 9:
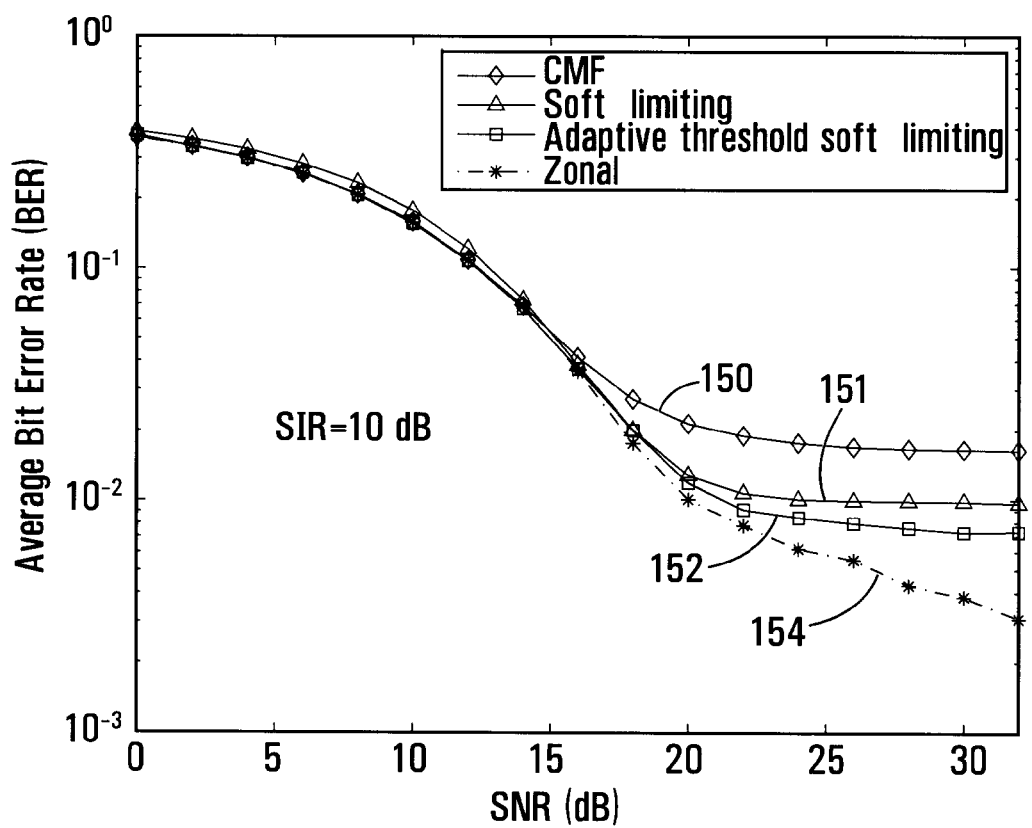
FIG. 9 contains plots of the average BER versus SNR of the conventional matched filter UWB receiver, the soft-limiting UWB receiver, the adaptive threshold soft-limiting UWB receiver and the zonal UWB receiver with adaptive thresholds with Ns=4 and Nu=4 when both MAI and AWGN are present in free-space propagation UWB channels.

FIG. 9 shows the BER curves for the CMF (conventional matched filter) UWB receiver (curve 150), the soft-limiting UWB receiver (curve 151), the adaptive threshold soft-limiting UWB receiver (curve 152), the zonal UWB receiver (curve 154) with $N_s=4$ and $N_u=4$ for the case where both MAI and AWGN are present in the channel. The SIR is 10 dB, and the SNR ranges from 0 dB to 32 dB. Observe that when the SNR is small, i.e. the AWGN dominates the MAI, $Y_m=I_m+N_m$ can be approximated as a Gaussian distributed RV, and the CMF UWB receiver is the optimal receiver. Under such circumstances, the soft-limiting UWB receiver underperforms the CMF UWB receiver, while the adaptive threshold soft-limiting UWB receiver and the zonal UWB receiver adjust their thresholds to meet the BER performance of the CMF UWB receiver. When the SNR becomes large enough that the noise term does not dominate the MAI, the soft-limiting UWB receiver, the adaptive threshold soft-limiting UWB receiver and the zonal UWB receiver all outperform the CMF UWB receiver. FIG. 9 shows that when the SNR exceeds 15 dB, the soft-limiting UWB receiver, the adaptive threshold soft-limiting UWB receiver and the zonal UWB receiver with near-optimal thresholds all outperform the CMF UWB receiver, and the BER curve for the zonal UWB receiver decreases faster than those of the soft-limiting UWB receiver and the adaptive threshold UWB receiver. The BER curves of the CMF UWB receiver and the adaptive threshold soft-limiting receiver both reach error rate floors before the BER curve of the zonal UWB receiver reaches an error floor. The error rate floor of the zonal UWB receiver is around $2.0 \times 10^{-3}$, which is 9 times smaller than that of the CMF UWB receiver ($1.8 \times 10^{-2}$), 4.9 times smaller than that of the soft-limiting UWB receiver ($9.8+10^{-3}$), and 4.75 times smaller than that of the adaptive threshold soft-limiting UWB receiver ($7.5 \times 10^{-3}$). The error rate floor of the zonal UWB receiver is not reached until the SNR exceeds 42 dB, which means that, in a practical sense, the zonal UWB receiver doesn't have an error rate floor for this value of SIR, because such large values of SNR cannot usually be achieved in practical wireless systems.

Figure 10:
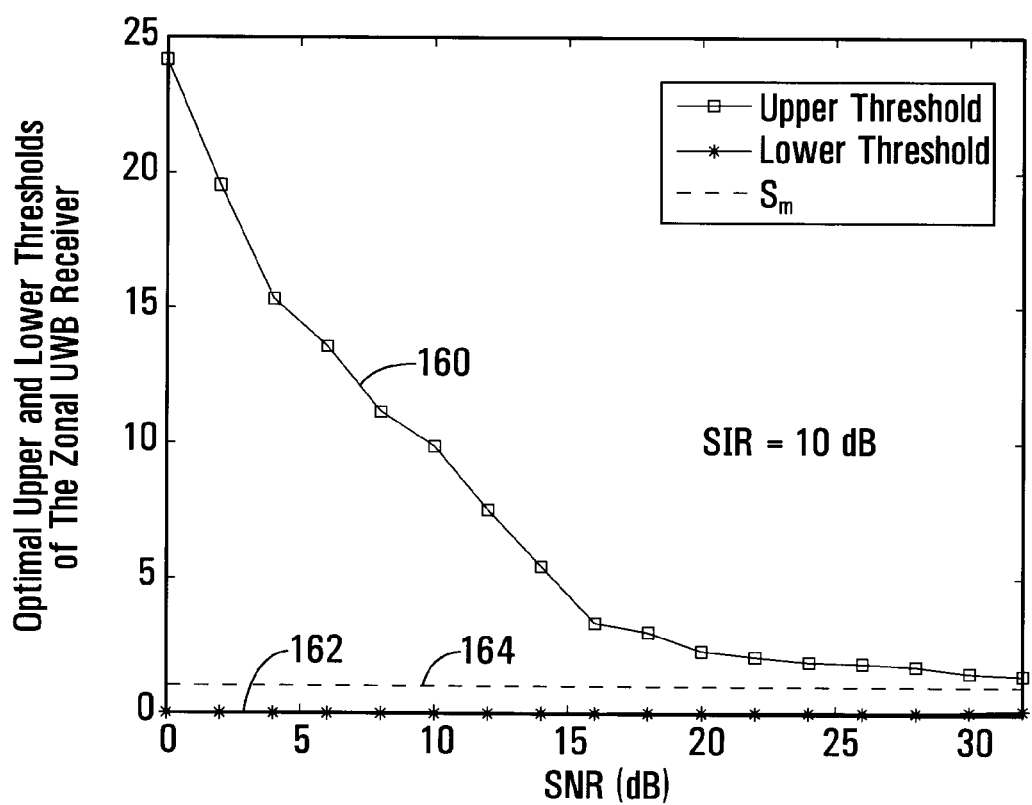
FIG. 10 contains plots of the optimal lower and upper thresholds of the zonal receiver with Ns=4 and Nu=4 when both MAI and AWGN are present in free-space propagation UWB channels.

FIG. 10 shows a set of optimal lower and upper thresholds of the zonal UWB receiver with $N_s=4$ and $N_u=4$ for the example of FIG. 9. It is seen that, when the AWGN dominates the MAI, where $Y_m=N_m+I_m$ can be approximated as a Gaussian distributed RV, the optimal lower threshold of the zonal UWB receiver is close to zero and the upper threshold is large, which makes the zonal UWB receiver very similar to the conventional matched filter UWB receiver. As the SNR gets larger and the MAI becomes more significant in $Y_m=N_m+I_m$, the optimal lower and upper thresholds move towards $S_m$. The optimal upper threshold is curve 160, the optimal lower threshold is 162 and $S_m$ is 164. When the SNR is large enough that the MAI dominates the AWGN, the optimal lower and upper threshold become close to $S_m$, and then the zonal UWB receiver structure is the same structure as first proposed for the case where only MAI is present in the channel.

The above adaptive examples assume adaptation based on AWGN and/or MAI. Other parameters can be measured/determined and used to perform the threshold adaption.

Figure 6A:
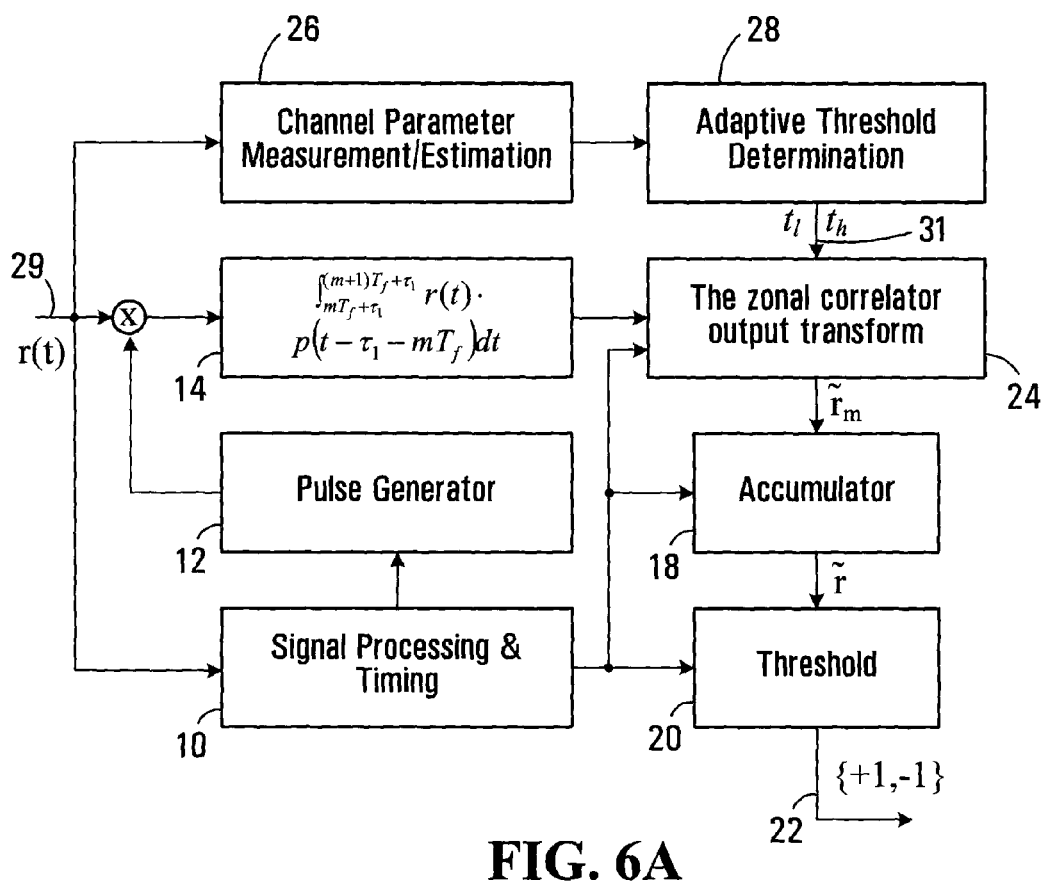
FIGS. 6A, 6B and 6C are block diagrams of three receivers featuring threshold adaption provided by embodiments of the invention.

A first example is shown in FIG. 6A. This differs from the example of FIG. 3 by the inclusion of a block that generates measurements and/or estimates in respect of the channel, and then uses these to determine the thresholds $t_l$ and $t_h$ that are then used by the zonal correlator output transform. Specifically, blocks that are the same as shown in FIG. 3 include blocks 10,12,14,18 and 20, and there is an input 29 and output 22. There is a zonal correlator output transform 24 that is similar to zonal correlator output transform 16 of FIG. 3, but which is connected to received adapted thresholds 31 as detailed below. The input 29 is also connected to a channel measurement/estimation block 26 the output of which is connected to an adaptive threshold determination block 28. The adaptive threshold determination block 28 is connected to output adapted thresholds 31 to the zonal correlator output transform 24.

In operation, the zonal receiver operates as in the FIG. 3 example, except that the zonal correlator output transform 24 operates using adapted thresholds 31 determined by the adaptive threshold determination block 28. In order to determine the adapted thresholds, the channel measurement/estimation block 26 generates measurements/estimates in respect of the channel. These can consist of measurements/estimates of channel parameters such as AWGN and MAI, the desired signal component, channel amplitudes, the number of multipaths, channel delays, and other parameters to name a few examples. More generally, anything that is somehow representative of the channel that can be measured and/or estimated from the received signal can be used as input to the adaptive threshold determination block. In some embodiments, the measurements/estimates may also include contributions from an interference component. These are passed to the adaptive threshold determination block 28 which determines the appropriate adaptive thresholds to use. In some embodiments, the thresholds $t_l$ and $t_h$ are adapted independently for each partial statistic. In some embodiments, the thresholds $t_l$ and $t_h$ are adapted commonly for all the partial statistics relating to the information bit. In some embodiments, the thresholds $t_l$ and $t_h$ are adapted commonly for all the partial statistics of the information bits relating to the same packet or other collection of information bits, or blocks of bits.

As indicated above, a mapping from the channel measurements/estimates to thresholds can be determined by computer search or experiment. Other methods include the use of use of a training sequence, or a feedback channel to name a few examples. The mapping thus determined is then used to determine the adaptive thresholds to use at a particular instant from the channel measurements/estimates in any suitable manner. Specific examples include table look-up, empirical equation, and feedback signal.

Figure 6B:
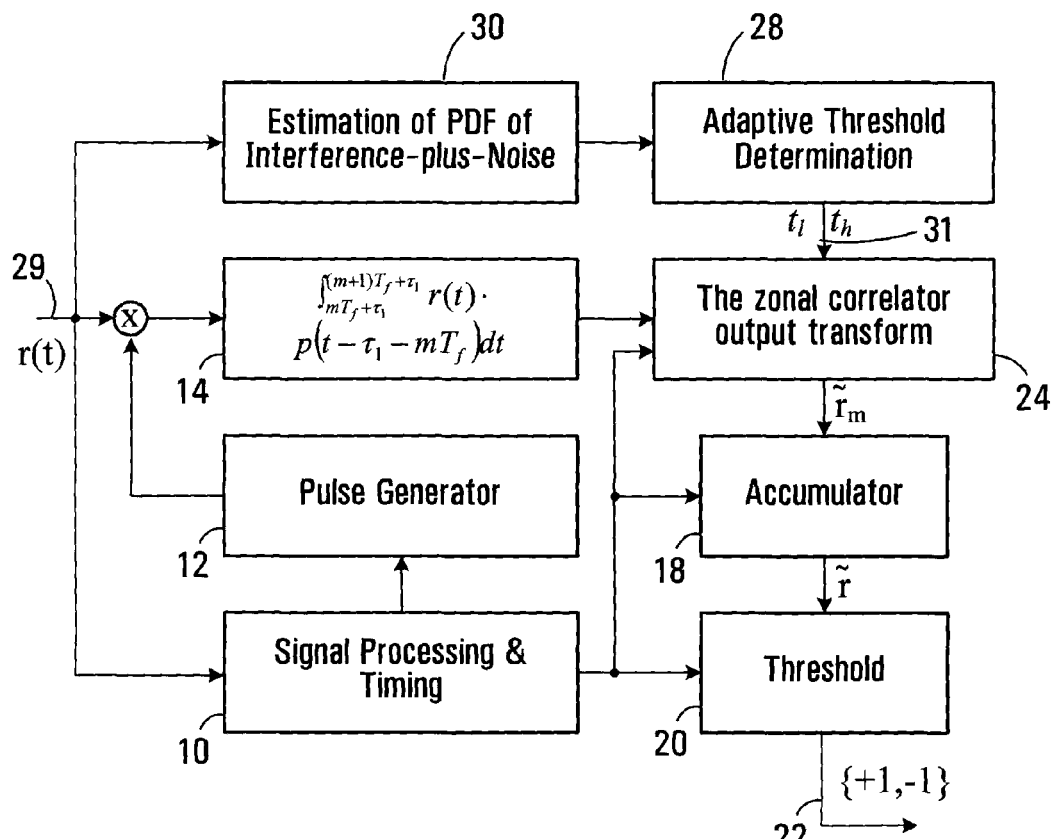

A second example is shown in FIG. 6B. This differs from the example of FIG. 6A in that instead of channel measurement/estimation block 26, a PDF of interference-plus-noise estimation block 30 is provided as a specific example of channel measurement/estimation. That is to say, the PDF of interference-plus-noise is yet another example of a measurement/estimate in respect of the channel. This estimated PDF is then used to determine the thresholds $t_l$ and $t_h$ that are then used by the zonal correlator output transform.

Figure 6C:
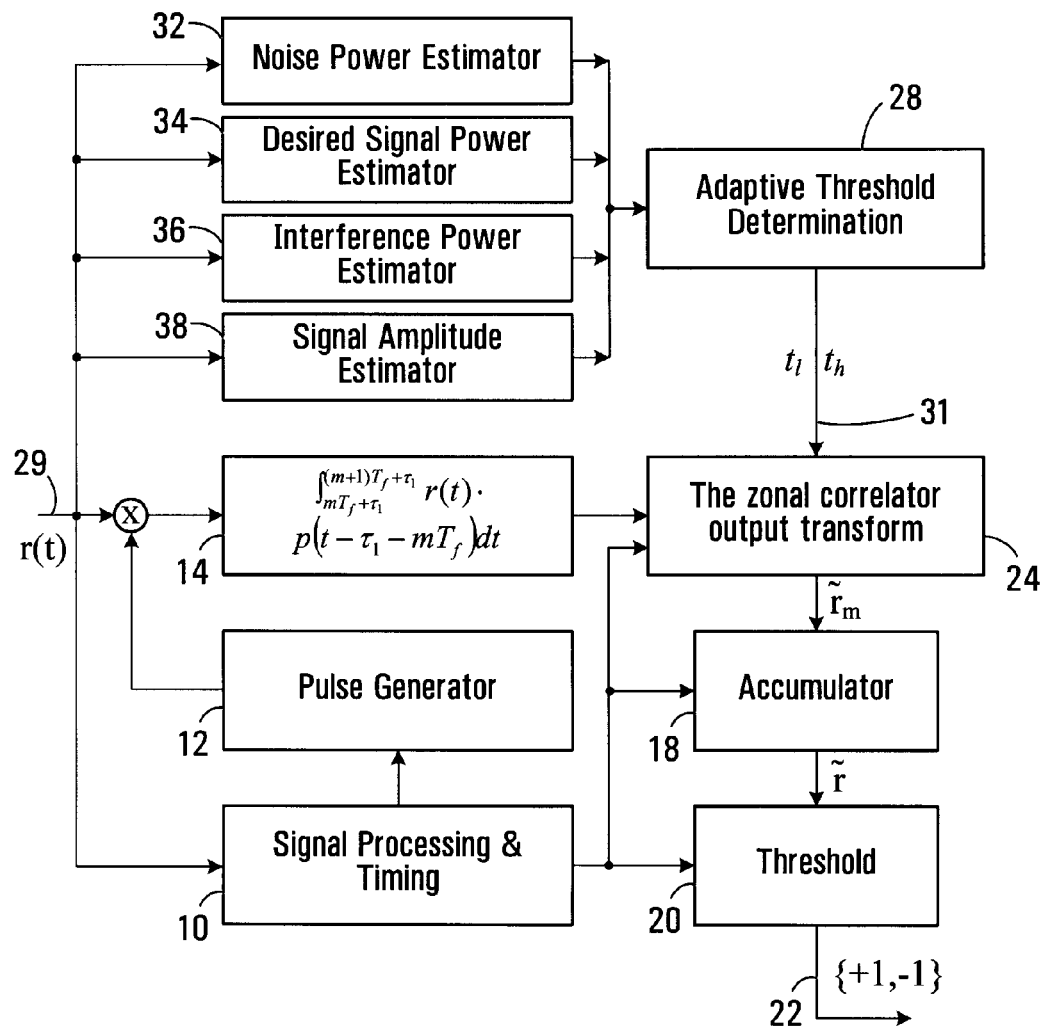

A third example is shown in FIG. 6C. This differs from the example of FIG. 6A in that instead of channel measurement/estimation block 26, a noise power estimator block 32, a desired signal power estimator block 34, an interference power estimator block 36, and a signal amplitude estimator block 38 are provided as specific examples of channel measurement/estimation. These blocks perform noise power estimation, desired signal power estimation, interference power estimation, and signal amplitude estimation. In some embodiments, only one or more of these blocks are provided. The estimates thus produced are then used to determine the thresholds $t_l$ and $t_h$ that are then used by the zonal correlator output transform 24.

This set of examples is not considered exhaustive.

The detailed examples above assume the zonal receiver approach is applied to the reception of a UWB signal. In some embodiments, the UWB signals are as defined in the literature to be any signal having a signal bandwidth that is greater than 20% of the carrier frequency, or a signal having a signal bandwidth greater than 500 MHz. In some embodiments, the zonal receiver approach is applied to signals having a signal bandwidth greater than 15% of the carrier frequency. In some embodiments, the zonal receiver approach is applied to signals having pulses that are 1 ns in duration or shorter. These applications are not exhaustive nor are they mutually exclusive. For example, most UWB signals satisfying the literature definition will also feature pulses that are 1 ns in duration or shorter.

Figure 11:
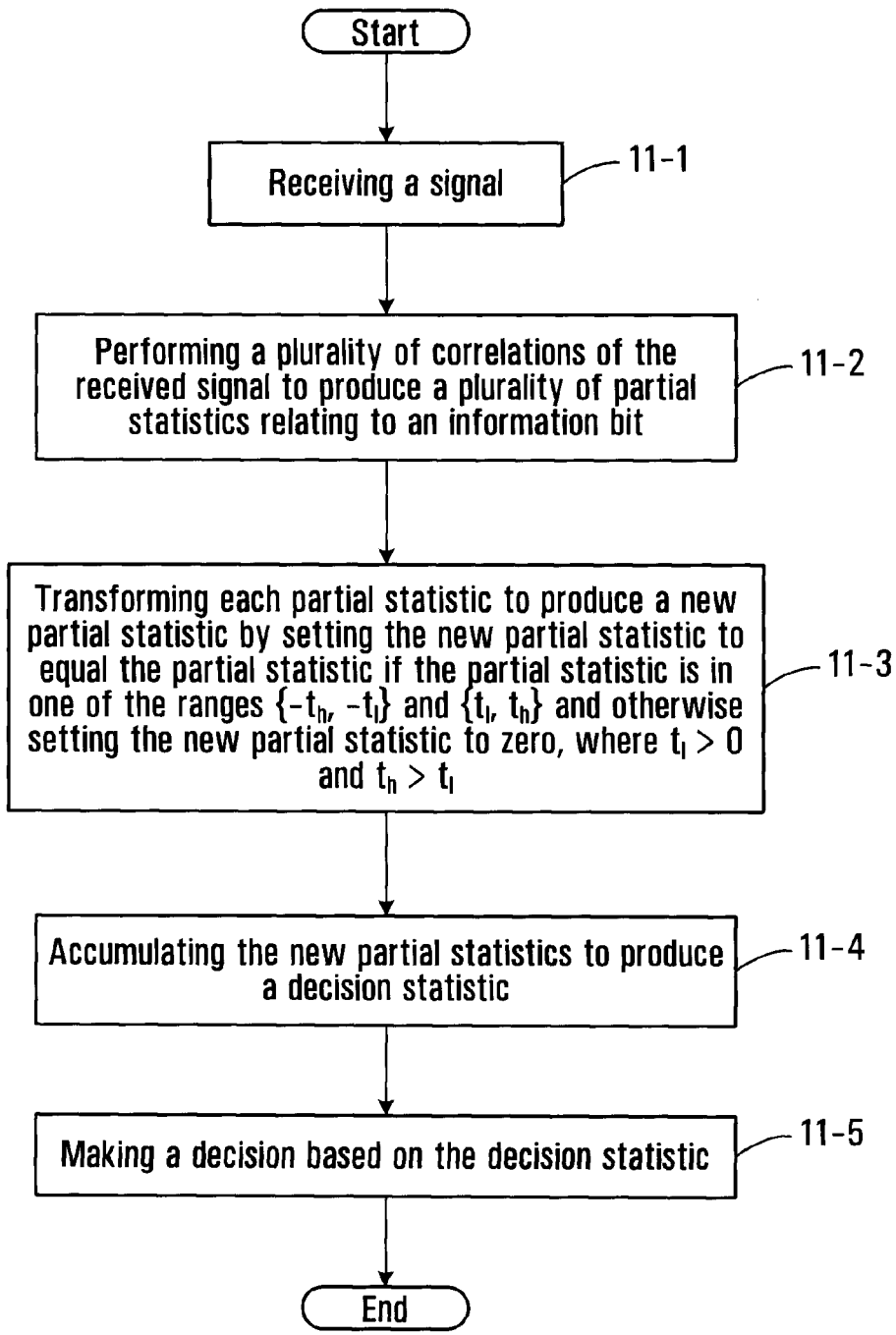
FIG. 11 is a flowchart of a method of performing reception using zonal reception, as provided by an embodiment of the invention.

More generally still, the zonal receiver approach can be applied to signals for which a plurality of correlations need to be performed in a receiver. An example of such a method will now be described with reference to FIG. 11. The method begins with receiving a signal at block 11-1. The method continues with performing a plurality of correlations upon the signal to produce a plurality of partial statistics relating to an information bit at block 11-2. The method continues with transforming each partial statistic to produce a new partial statistic at block 11-3 by setting the new partial statistic to equal the partial statistic if the partial statistic is in one of the ranges $(-t_h, -t_l)$ and $(t_l, t_h)$ and otherwise setting the new partial statistic to zero, where $t_l>0$ and $t_h>t_l$. The method continues with accumulating the new partial statistics to produce a decision statistic at block 11-4. The method continues with making a decision based on the decision statistic at 11-5.

In a specific example, the method might be applied for a plurality of correlations determined by the repetition code in a UWB receiver as in the detailed examples presented herein. In other applications, the method is applied for a plurality of correlations in a Rake receiver or a finger of a Rake receiver. That is to say, the correlations are used across signal chips of a repetition code, across the fingers of a Rake receiver. In other embodiments, the new receiver is used as a unit in each finger of a Rake receiver.

The above examples have assumed a specific zonal receiver structure in which a given partial statistic is transformed by setting a new partial statistic to equal the partial statistic when the partial statistic is one of two ranges that are the same size and symmetrically located on opposite sides of zero, and otherwise setting the new partial statistic to zero. More generally, there may be multiple ranges that may not necessarily be symmetrically located on opposite sides of zero. In addition, the new partial statistics for one or more ranges may in some cases be set to a weighted value of the partial statistic.

For example, in the embodiments described above, it has been assumed that the information symbols are bits and as such, there are two ranges of the partial statistic that are considered. If M-ary symbols are employed, then additional ranges of the partial statistic may be employed.

In some embodiments, the form of UWB system employed (Time-Hopping PPM or BPSK) is carrierless. In such embodiments, the zonal receiver is a baseband receiver because the system is a baseband system. In such a system, the correlation may be performed on the "raw" received signal from the antenna.

In some embodiments, a carrier-based UWB system is employed. In these systems, the zonal reception processing is still done at baseband. An RF front end performs RF conversion of the received signal to baseband.

Figure 12:
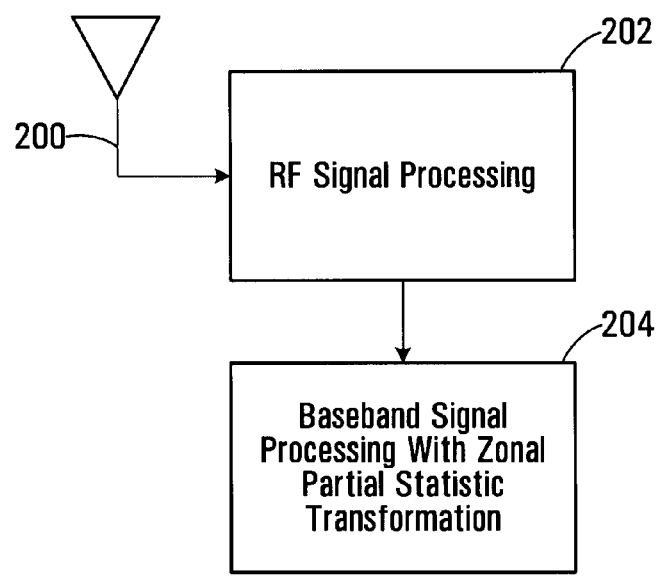
FIG. 12 is a block diagram of a receiver provided by an embodiment of the invention.

FIG. 12 is a block diagram of a receiver that might implement one or more of the embodiments described herein. This specific example assumes a carrier-based UWB system. A carrierless system would be the same as FIG. 12, less the RF signal processing block 202. The receiver has at least one antenna 200, an RF signal processing block 202, and a baseband signal processing with zonal partial statistic transformation block 204. The RF signal processing block 202 is responsible for converting a raw signal received over the antenna 200 into a signal that can be processed by the baseband signal processing with zonal partial statistic transformation block 204. The RF signal processing block 202 may contain any number of components, in hardware, software and/or firmware for performing any number of RF signal processing functions. The baseband signal processing zonal partial statistic transformation block 204 executes one or more of the methods described herein. It may be implemented in hardware, software, and/or firmware.

RAKE Receiver Embodiment

Details of an example implementation of the Zonal receiver within a RAKE receiver will now be described.

In multipath fading channels, the channel impulse response (CIR) for the kth user can be described as $$h^{(k)}(t) = \sum_{l=0}^{N_r-1} \alpha_l^{(k)} \delta(t - T_{s_l}^{(k)}) \quad (R1)$$

where $\alpha_l^{(k)}$ and $T_{s_l}^{(k)}$ are the amplitude and delay of the lth multipath component of the kth user, respectively. The parameter $N_r$ is the total number of resolved multipath components. We consider a TH-BPSK signal (eq. (1)) for signal transmission, and the received signal is $$r(t) = A_1[h^{(1)}(t) * s^{(1)}(t-\tau_1)] + \sum_{k=2}^{N_u} A_k[h^{(k)}(t) * s^{(k)}(t-\tau_k)] + n(t) \quad (R2)$$

where * denotes convolution, and $A_k$ and $\tau_k$ are the amplitude and delay of the kth user, respectively.

Note that the robustness of UWB signals to multipath is due to their fine delay resolution (See M. Z. Win and R. A. Scholtz, "On the robustness of ultra-wide bandwidth signals in dense multipath environments," IEEE Commun. Lett., vol. 2, pp. 51-53, February 1998.), and high diversity order can be exploited with the adoption of a Rake receiver in UWB systems (See M. Z. Win, G. Chrisikos, and N. R. Sollenberger, "Performance of Rake reception in dense multipath channels: implications of spreading bandwidth and selection diversity order," IEEE J. Select. Areas Commun., vol. 18, pp. 1516-1525, August 2000). Rake reception is used for signal recovery in such a scenario. Assume that the first information bit of the first user is the desired signal. In the lth Rake finger, the conventional matched filter which adopts $p(t-mT_f-\tau_l-T_{s_l})$ as the correlation waveform, is used to coherently detect the signal to be recovered, the statistic in the lth finger of the Rake receiver can be expressed as $$r_l = \sum_{m=0}^{N_s-1} \int_{T_{s_l}+mT_f}^{T_{s_l}+(m+1)T_f} r(t)p(t - mT_f - \tau_1 - T_{s_l})dt \quad (R4)$$

$$= \sum_{m=0}^{N_s-1}(S_{l,m} + I_{l,m} + N_{l,m}) = \sum_{m=0}^{N_s-1}(S_{l,m} + Y_{l,m})$$

$$= \sum_{m=0}^{N_s-1} r_{l,m}$$

where $S_{l,m}$, $I_{l,m}$ and $N_{l,m}$ are the desired signal component, the interference and the AWGN term in the mth frame of the desired information bit in the lth finger of the Rake receiver, respectively. The decision statistic $r_l$ in the lth finger of the CMF based Rake receiver is $$r_l = \sum_{m=0}^{N_s-1} r_{l,m}. \quad (R5)$$

MRC or other combining technique is then used to combine the signals from all the Rake fingers as $$r_{final} = \sum_{l=0}^{L-1} a_l r_l \quad (R6)$$

where $\{\alpha_l\}_{l=0}^{L-1}$ are the weights for combining chosen differently according to different combining schemes. For example, the weight $\alpha_l$ in MRC is proportional to the rms signal amplitude and inversely proportional to the mean square noise power in the particular finger l. The parameter L is the number of fingers in a Rake receiver. For example, in partial Rake (PRake) receivers, the first L arriving paths are combined, and the number of the fingers $L \leq N_r$, where $N_r$ is the total number of resolved multipath components.

A new Rake receiver structure adopts the zonal correlator output transform in each Rake finger. Thus, the new mth chip correlator in the lth finger of the new Rake receiver, $\tilde{r}_{l,m}$, is obtained from $r_{l,m}$ through the transformation $$\tilde{r}_{l,m} = \begin{cases} r_{l,m}, & r_{l,m} \in (-t_h, -t_l) \text{ or } r_{l,m} \in (t_l, t_h) \\ 0, & \text{otherwise.} \end{cases} \quad (R7)$$

The final decision statistic in the lth finger of the new Rake receiver is obtained as $$\tilde{r}_l = \sum_{m=0}^{N_s-1} \tilde{r}_{l,m}. \quad (R8)$$

Figure 13:
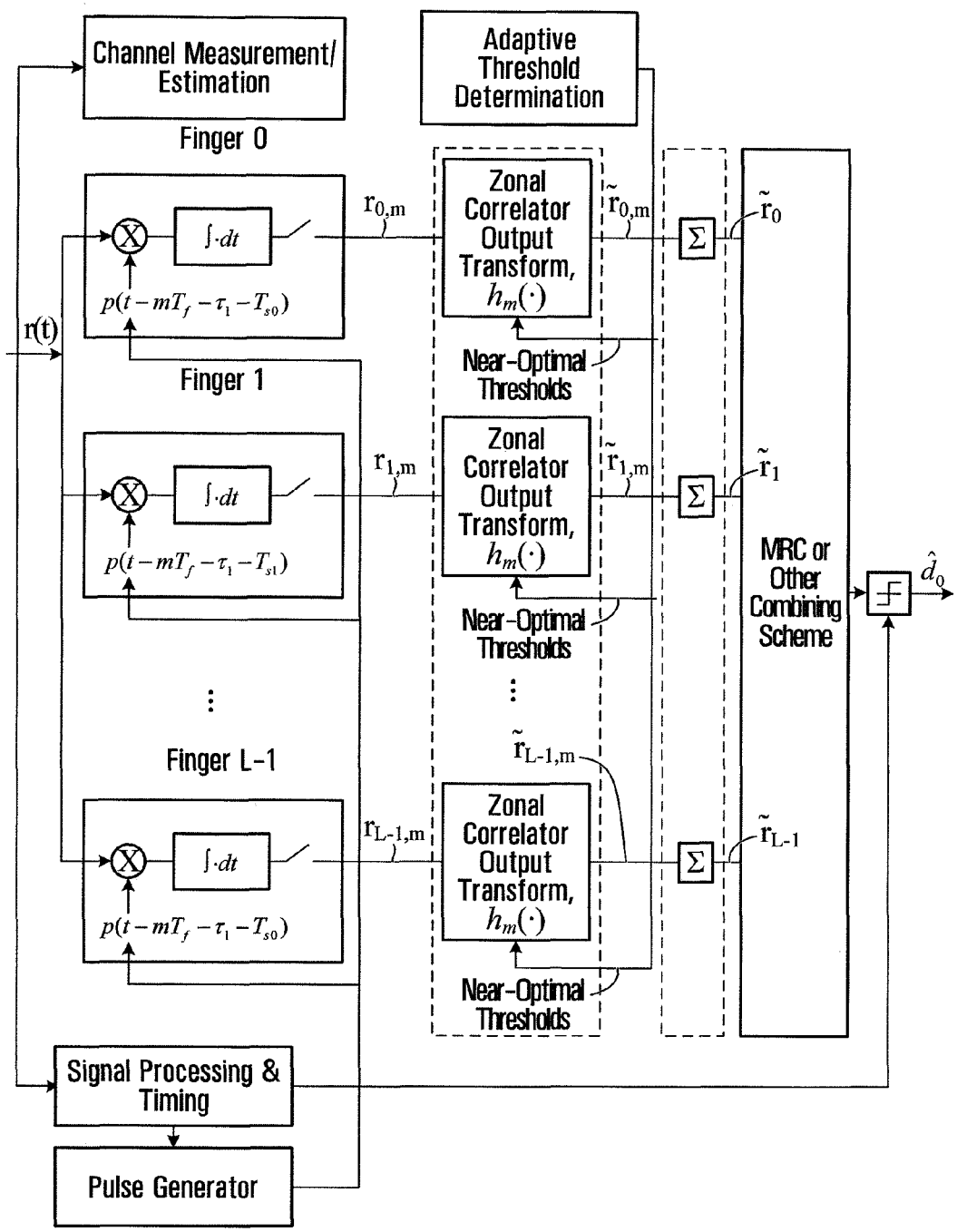
FIG. 13 is a block diagram of a receiver provided by an embodiment of the invention.

MRC or other combining technique is then used to combine the signals from all the Rake fingers in similar fashion as in the CMF based Rake receiver case, and the final decision statistic can be expressed as $$\tilde{r}_{final} = \sum_{l=0}^{L-1} a_l \tilde{r}_l. \quad (R9)$$

where $\{a_l\}_{l=0}^{L-1}$ are the weights for combining as indicated above,

Referring now to FIG. 13, a block diagram of the zonal based Rake receiver will be described. This new Rake receiver has an input for receiving a received signal r(t), signal processing and timing block, pulse generator, and correlator in each Rake finger operatively coupled together in sequence. The input is also connected to a channel measurement/estimation block the output of which is connected to an adaptive threshold determination block. The adaptive threshold determination block is connected to output adaptive thresholds to the zonal correlator output transform in each Rake finger. In the lth Rake finger, the output of the correlator $r_{l,m}$ relating to the mth frame of the desired information bit is input to a zonal correlator output transform, which is transformed into a new partial statistic $\tilde{r}_{l,m}$ by the zonal correlator output transform block; the new statistics $\tilde{r}_{l,m}$'s relating to the same information bit are accumulated to produce the statistic $\tilde{r}_l$ in the lth Rake finger; maximal-ratio combining (MRC) diversity or other combining technique is then employed to combine the statistics from all the Rake fingers and form a final decision statistic. This is then processed by threshold block to produce an output. The zonal correlator output transform, accumulation block, MRC block, and threshold function are also operatively coupled to the signal processing and timing function.

In operation, the received signal r(t) is processed by signal processing and timing block to recover timing. As a function of this timing, the pulse generator generates a template pulse for use by the correlator for every single Rake finger in performing a correlation between the template pulse and r(t). Meanwhile, the channel measurement/estimation block performs an estimation of channels. The estimates become the input of the adaptive threshold determination block, where they are used to determine the optimal thresholds $t_l$ and $t_h$ for each Rake finger. The zonal correlator output transform block operates using these near-optimal thresholds to transform the statistic $r_{l,m}$ into a new statistic $\tilde{r}_{l,m}$ as described in detail (using equation (R7)). Then $\tilde{r}_m$s relating to the same bit are summed in the accumulator to produce the statistics $\tilde{r}_l$ in the lth Rake finger. MRC diversity or other combining technique is then employed to combine the signals from all Rake fingers to obtain the final decision statistic, and a final decision on the sum is made by the threshold function.

Performance Results and Discussion

The BER performance of the zonal based Rake receiver is evaluated and compared to that of the above-referenced CMF based Rake receiver. The signal waveform for the analysis is restricted to the second-order Gaussian monocycle. The system parameters are the same as in the ideal free-space propagation scenario in Table I. The CM1 channel model in the J. R. Foerster, "Channel modeling sub-committee report (final)," IEEE P802.15-02/490r1-SG3a, February 2003 is used for signal transmission.

In some embodiments where the Rake structure is adopted, the zonal structure is used in each finger of the Rake receiver. The thresholds $t_l$ and $t_h$ for the zonal nonlinear correlator transform in each Rake finger are adaptive. It is noted that in such systems, if the lower threshold $t_l$ can be set to 0 and the upper threshold $t_h$ can be set to infinity (or some large number), the zonal based Rake receiver becomes exactly the conventional matched filter based Rake receiver for those threshold settings. Thus, in the adaptive embodiments, the zonal UWB receiver can always meet or outperform the conventional matched filter UWB receiver.

In some embodiments operating in multipath fading UWB channels, the Rake structure based on the zonal UWB receiver design is adopted, and the optimal thresholds for the zonal transform are selected separately for each Rake finger.

In some embodiments operating in multipath fading UWB channels, the Rake structure based on the zonal UWB receiver design is adopted, and the optimal thresholds for the zonal transform are selected for all the Rake fingers.

In some embodiments, experiment or computer searching can be used to obtain the optimal lower and upper thresholds that minimize the BER as a function of one or more channel quality parameters, or maximize the SINR as a function of one or more channel quality parameters.

Figure 14:
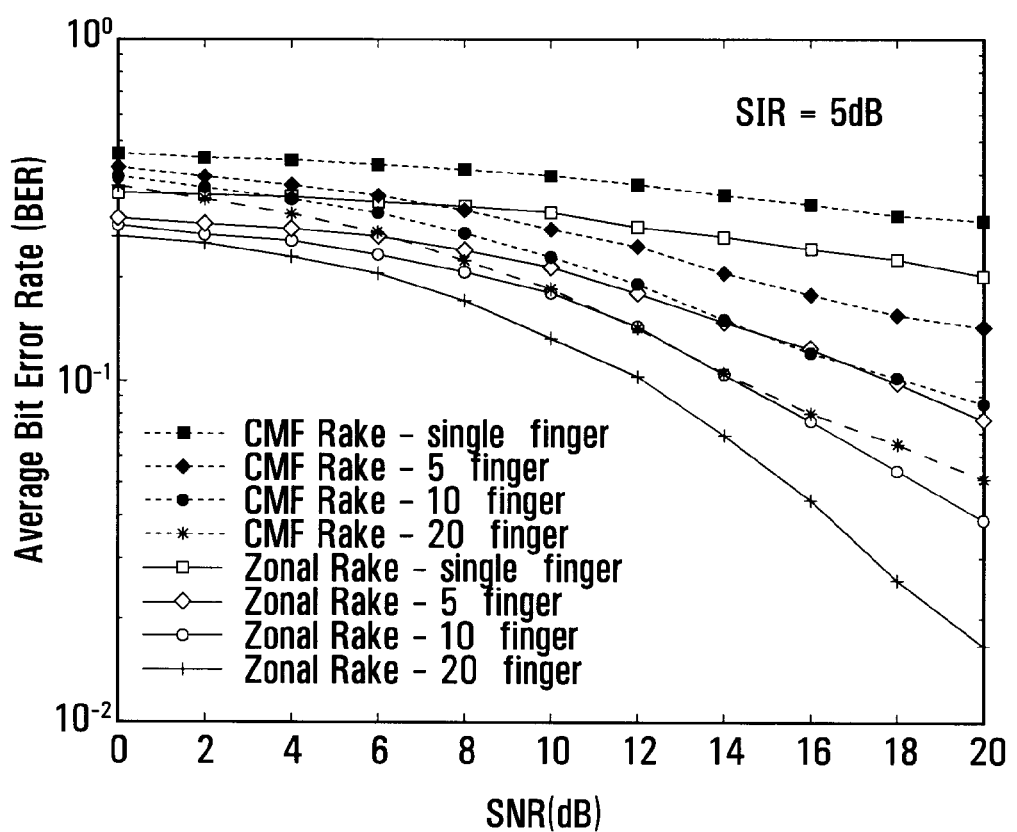
FIGS. 14 and 15 contain plots comparing the performance of a zonal Rake receiver with a conventional matched filter Rake receiver.

A PRake receiver which collects the first L arriving paths is considered. The MRC structure is used to combine the outputs of the taps. For the PRake receiver, the number of paths L is set to be 1 (single path (SP)), 5, 10 and 20. FIG. 14 shows the BER curves of the zonal based Rake receiver and the CMF based Rake receiver when the SIR=5 dB, and the values of SNR range from 0 dB to 20 dB in CM1 UWB channels. It is shown in FIG. 14 that the zonal based Rake receiver always outperforms the CMF based Rake receiver, and the BER performance gain of the zonal based Rake receiver over the CMF Rake receiver grows with increasing SNR. Note also that the BER performance gain of the zonal based Rake receiver becomes more significant if more paths are combined. For example, for the PRake receiver with L=5, and L=10, the BER of the zonal based Rake receiver is as much as 1.92 times, and 2.18 times smaller than that of the CMF based Rake receiver, respectively. As for the PRake receiver with L=20, the BER of the zonal based structure is as much as 2.83 times smaller than that of the CMF based Rake receiver structure.

Figure 15:
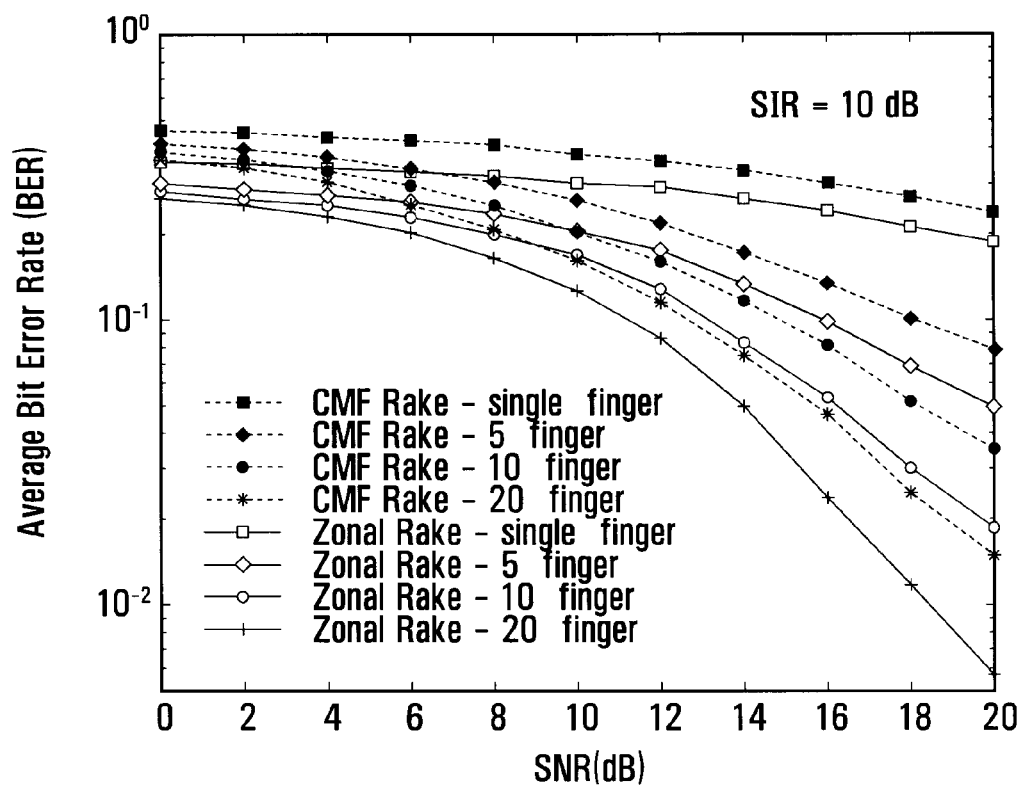

FIG. 15 shows BER curves for the zonal based Rake receiver and the CMF based Rake receiver for the same operating conditions as in FIG. 14 when the SIR is 10 dB. Observe that the BER changes in the same manner as in FIG. 14. However, it is also noted in FIG. 15 that although the zonal based Rake receiver can always achieve better BER performance than the CMF based Rake receiver, the performance gain is not as significant as that seen in FIG. 14 when the SIR=5 dB. This is because the MAI component becomes less significant compared to the AWGN term when the value of SNR in the system is fixed and the SIR value gets larger. This behavior of the zonal based Rake receiver makes this novel structure valuable in multipath fading UWB channels when the multiple access interference is strong.

The above example is based on using a PRake receiver which collects the first L arriving paths. However, other Rake receiver structures, e.g. ARake which collects all the resolved paths, or SRake which collects L paths with the strongest SNR, can also be adopted in embodiments of the invention.

The above example is based on using MRC to implement the diversity. Other combining schemes can also be adopted to combine the signals from all or some of the Rake fingers.

In some embodiments, the wireless signals are radio signals; in other embodiments the wireless signals are take other forms, such as diffuse infrared to name a specific example.

The above adaptive examples assume adaptation based on the desired signal component, the AWGN and/or MAI (the SNR and/or SIR in the example case). Other parameters can be measured/determined in the channel measurement/estimation block, and used to perform the threshold adaptation.

Numerous modifications and variations of the present invention are possible in light of the above teachings. It is therefore to be understood that within the scope of the appended claims, the invention may be practiced otherwise than as specifically described herein.

We claim:

1. A method comprising:
   receiving a signal;
   performing a plurality of correlations upon the signal to produce a plurality of first partial statistics relating to an information bit;
   transforming the plurality of first partial statistics to produce a plurality of second partial statistics by:
   for each first partial statistic, setting one of the plurality of second partial statistics to equal the first partial statistic if the first partial statistic is in one of the ranges $(-t_h, -t_l)$ and $(t_l, t_h)$ and otherwise setting the one of the plurality of second partial statistics to zero, where $t_l>0$ and $t_h>t_l$;
   accumulating the plurality of second partial statistics to produce a decision statistic; and
   making a decision based on the decision statistic.

2. The method of claim 1 wherein:
   receiving the signal comprises receiving a time hopping UWB signal; and
   performing the plurality of correlations comprises performing a respective correlation between the received signal and a pulse shape for each of a plurality of time hopped representations of the information bit.

3. The method of claim 1 wherein:
   receiving the signal comprises receiving a signal having a carrier frequency and signal bandwidth, wherein the signal bandwidth satisfies at least one of:
   greater than 20% of the carrier frequency; and
   bandwidth greater than 500 MHz.

4. The method of claim 1 wherein:
   receiving the signal comprises receiving a signal having a carrier frequency and signal bandwidth, where the signal bandwidth is greater than 15% of the carrier frequency.

5. The method of claim 1 wherein receiving the signal comprises receiving a signal that originally had pulses that are 1 ns in duration or shorter.

6. The method of claim 1 wherein performing the plurality of correlations comprises:
   performing the plurality of correlations in a RAKE receiver or a finger of a RAKE receiver.

7. The method of claim 1 further comprising:
   adapting thresholds $t_l$ and $t_h$ as a function of one or more measurements and/or estimates in respect of a channel over which the signal was received.

8. The method of claim 7 wherein adapting the thresholds comprises:
   adapting the thresholds $t_l$ and $t_h$ independently for each first partial statistic.

9. The method of claim 7 wherein adapting the thresholds comprises:
   adapting the thresholds $t_l$ and $t_h$ commonly for all of the plurality of first partial statistics relating to the information bit.

10. The method of claim 7 wherein adapting the thresholds comprises:
    adapting the thresholds $t_l$ and $t_h$ commonly for the plurality of first partial statistics of all of a set of information bits relating to a packet, or some other collection of information bits.

11. The method of claim 7 wherein adapting the thresholds comprises:
    determining an estimate of AWGN (additive white Gaussian noise); and
    selecting the thresholds as a function of the estimate of AWGN.

12. The method of claim 7 wherein adapting the thresholds comprises:
    determining an estimate of multi-access interference; and
    selecting the thresholds as a function of the estimate of multi-access interference.

13. The method of claim 7 wherein adapting the thresholds comprises:
    determining an estimate of AWGN;
    determining an estimate of multi-access interference; and
    selecting the thresholds as a function of the estimate of AWGN and the estimate of multi-access interference.

14. The method of claim 13 wherein selecting the thresholds as the function of the estimate of AWGN and the estimate of multi-access interference is done using a table lookup.

15. The method of claim 7 wherein adapting the thresholds comprises:
    measuring and/or estimating at least one of desired signal amplitude, desired signal power, interference power, and interference signal amplitude; and
    selecting the thresholds as a function of the at least one of desired signal amplitude, desired signal power, interference power, and interference signal amplitude.

16. The method of claim 7 wherein adapting the thresholds comprises:
    determining an estimate of a PDF (probability density function) of interference-plus-noise; and
    using the estimate of the PDF to determine the thresholds.

17. The method of claim 1 wherein the signal is a carrier-less UWB signal.

18. The method of claim 1 wherein the signal is a carrier-based UWB signal, the method further comprising downconverting the carrier-based UWB signal to produce a downconverted signal before performing the plurality of correlations, the plurality of correlations being performed on the downconverted signal.

19. A method comprising:
    receiving a signal;
    performing RF signal processing on the received signal to produce a baseband signal;
    performing a plurality of correlations on the baseband signal to produce a plurality of first partial statistics relating to an information bit in each of a plurality of Rake fingers;
    transforming the plurality of first partial statistics to produce a plurality of
    second partial statistics in each Rake finger by:
    for each first partial statistic, setting one of the plurality of second partial statistics to equal the first partial statistic if the first partial statistic is in one of the ranges $(-t_h, -t_l)$ and $(t_l, t_h)$ and otherwise setting the one of the plurality of second partial statistics to zero, where $t_l>0$ and $t_h>t_l$;
    in each Rake finger, summing the plurality of second partial statistics relating to the same information bit to produce a respective sum;
    maximal-ratio combining the from all the Rake fingers to produce a decision statistic; and
    making a decision based on the decision statistic.

20. A method comprising:
    receiving a signal;
    performing a plurality of correlations upon the received signal to produce a plurality of first partial statistics relating to an information symbol;

transforming the plurality of first partial statistics to produce a plurality of second partial statistics by:
a) for at least one range of each first partial statistic, setting one of the plurality of second partial statistics to equal the first partial statistic;
b) for at least one range of each first partial statistic, setting the one of the plurality of second partial statistics to a weighted version of the first partial statistic;
accumulating the plurality of second partial statistics to produce a decision statistic; and
making a decision based on the decision statistic.

21. The method of claim 20 wherein transforming the plurality of first partial statistics to produce the plurality of second partial statistics further comprises:
for at least one range of each first partial statistic, setting the one of the plurality of second partial statistics to be zero.

22. The method of claim 20 wherein:
receiving the signal comprises receiving a time hopping UWB signal; and
performing the plurality of correlations comprises performing a respective correlation between the received signal and a pulse shape for each of a plurality of time hopped representations of the information symbol.

23. The method of claim 20 wherein:
receiving the signal comprises receiving a signal having a carrier frequency and signal bandwidth, wherein the signal bandwidth satisfies at least one of:
greater than 20% of the carrier frequency; and
bandwidth greater than 500 MHz.

24. The method of claim 20 wherein:
receiving the signal comprises receiving a signal having a carrier frequency and signal bandwidth, where the signal bandwidth is greater than 15% of the carrier frequency.

25. The method of claim 20 wherein receiving the signal comprises receiving a signal that originally had pulses that are 1 ns in duration or shorter.

26. A receiver comprising:
at least one antenna for receiving a signal;
a correlator configured to perform a plurality of correlations upon the signal to produce a plurality of first partial statistics relating to an information bit;
a zonal correlator output transform block configured to transform the plurality of first partial statistics to produce a plurality of second partial statistics by:
for each first partial statistic, setting one of the plurality of second partial statistics to equal the first partial statistic if the first partial statistic is in one of the ranges $(-t_h, -t_l)$ and $(t_l, t_h)$ and otherwise setting the one of the plurality of second partial statistics to zero, where $t_l>0$ and $t_h>t_l$;
an accumulator configured to accumulate the plurality of second partial statistics to produce a decision statistic; and
a threshold function block configured to make a decision based on the decision statistic.

27. A receiver comprising:
at least one antenna for receiving a signal;
an RF signal processing block that performs RF signal processing on the received signal via the at least one antenna to produce a baseband signal; and
a baseband signal processing with zonal partial statistic transformation block that processes the baseband signal to produce a decision, wherein the baseband signal processing with zonal partial statistic transformation block is configured to:
perform a plurality of correlations on the baseband signal to produce a plurality of first partial statistics relating to an information bit;
transform the plurality of first partial statistics to produce a plurality of second partial statistics by, for each first partial statistic, setting one of the plurality of second partial statistics to equal the first partial statistic if the first partial statistic is in one of the ranges $(-t_h, -t_l)$ and $(t_l, t_h)$ and otherwise setting the one of the plurality of second partial statistics to zero, where $t_l>0$ and $t_h>t_l$;
accumulate the plurality of second partial statistics to produce a decision statistic; and
make a decision based on the decision statistic.

* * * * *

UNITED STATES PATENT AND TRADEMARK OFFICE
CERTIFICATE OF CORRECTION

| | | |
|---|---|---|
| PATENT NO. | : 8,498,323 B2 | Page 1 of 1 |
| APPLICATION NO. | : 12/530562 | |
| DATED | : July 30, 2013 | |
| INVENTOR(S) | : Norman C. Beaulieu et al. | |

It is certified that error appears in the above-identified patent and that said Letters Patent is hereby corrected as shown below:

In the Claims

Column 20, line 60 - Claim 19, "maximal-ratio combining the from all the Rake fingers to…" should read -- maximal-ratio combining the sums from all the Rake fingers to --

Column 21, line 5 - Claim 20, "the first partial statistic;" should read -- the first partial statistic; and --

Signed and Sealed this
Twelfth Day of August, 2014

Michelle K. Lee
*Deputy Director of the United States Patent and Trademark Office*